US010722872B2

(12) United States Patent
Chen et al.

(10) Patent No.: US 10,722,872 B2
(45) Date of Patent: Jul. 28, 2020

(54) JMZ-5 AND JMZ-6, ZEOLITES HAVING AN SZR-TYPE CRYSTAL STRUCTURE, AND METHODS OF THEIR PREPARATION AND USE

(71) Applicant: JOHNSON MATTHEY PUBLIC LIMITED COMPANY, London (GB)

(72) Inventors: Hai-Ying Chen, Wayne, PA (US); Joseph Fedeyko, Wayne, PA (US); Raul Lobo, Newark, DE (US); Jelvehnaz Mirzababaei, West Chester, OH (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/541,412

(22) Filed: Aug. 15, 2019

(65) Prior Publication Data

US 2019/0366312 A1    Dec. 5, 2019

Related U.S. Application Data

(63) Continuation of application No. 15/698,735, filed on Sep. 8, 2017, now Pat. No. 10,399,066.

(Continued)

(51) Int. Cl.
*C01B 39/48* (2006.01)
*B01J 29/70* (2006.01)
(Continued)

(52) U.S. Cl.
CPC .......... *B01J 29/70* (2013.01); *B01D 53/9418* (2013.01); *B01D 53/9436* (2013.01); *B01J 29/76* (2013.01); *B01J 29/78* (2013.01); *B01J 35/002* (2013.01); *B01J 35/0006* (2013.01); *B01J 35/04* (2013.01); *B01J 37/0018* (2013.01); *B01J 37/04* (2013.01); *B01J 37/10* (2013.01); *C01B 39/026* (2013.01); *C01B 39/48* (2013.01); *B01D 2255/50* (2013.01); *C01P 2002/30* (2013.01); *C01P 2004/30* (2013.01)

(58) Field of Classification Search
CPC ........ C01B 39/026; C01B 39/48; B01J 29/70; B01J 29/76; B01J 29/78; C01P 2002/30; C01P 2004/30; B01D 53/9418; B01D 53/9436; B01D 2255/50
See application file for complete search history.

(56) References Cited

U.S. PATENT DOCUMENTS 5,118,483 A * 6/1992 Barri ........................ B01J 29/04
208/46

OTHER PUBLICATIONS

Merriam Webster, "acicular", downloaded Sep. 29, 2018 (Year: 2018).*

(Continued)

*Primary Examiner* — David M Brunsman

(57) ABSTRACT

JMZ-5, an aluminosilicate having an SZR framework type and a sea-urchin type morphology is described. A calcined product, JMZ-5C, formed from JMZ-5 is also described. JMZ-6, an aluminosilicate having an SZR framework type and a needle, aggregate morphology is described. A calcined product, JMZ-6C, formed from JMZ-6 is also described. Methods of preparing these zeolites and their metal-containing calcined counterparts are described along with methods of using these zeolites and their metal containing calcined counterparts in treating exhaust gases.

13 Claims, 15 Drawing Sheets

Related U.S. Application Data

(60) Provisional application No. 62/385,288, filed on Sep. 9, 2016.

(51) Int. Cl.
<table>
<tr><td><i>B01D 53/94</i></td><td>(2006.01)</td></tr>
<tr><td><i>B01J 29/78</i></td><td>(2006.01)</td></tr>
<tr><td><i>B01J 29/76</i></td><td>(2006.01)</td></tr>
<tr><td><i>C01B 39/02</i></td><td>(2006.01)</td></tr>
<tr><td><i>B01J 35/00</i></td><td>(2006.01)</td></tr>
<tr><td><i>B01J 35/04</i></td><td>(2006.01)</td></tr>
<tr><td><i>B01J 37/00</i></td><td>(2006.01)</td></tr>
<tr><td><i>B01J 37/04</i></td><td>(2006.01)</td></tr>
<tr><td><i>B01J 37/10</i></td><td>(2006.01)</td></tr>
</table>

(56) References Cited

OTHER PUBLICATIONS

Jaroonvechatam et al, "SUZ-4 zeolite synthesis derived from rice husk ash", Chiang Mai J. Sci. 2013, pp. 109-116 (Year: 2013).*

Worathanakkul et al, "Kinetic model of nitric oxide reduction on CuFe/SUZ-4 catalyst in packed bed column", International jounal of chemical engineering and applications, vo!6, No. 6 (Dec. 2015) (Year: 2015).*

Paik et al, "Sythesis of zeolites PI and SUZ-4 through a synergy of organic N'N'N'N'N'N'-hexaethylpentanediammonium and inorganic cations", Chem. Commun., 2000, 1609-1610 [PAIK I] (Year: 2000).*

Paik et al, "Host-Guest interactions in PI, SUZ-4 and ZSM-57 zeolites . . . ", J. Phys. Chem. B 2001, 105, 9994-10000. [PAIK II] (Year: 2001).*

Kim et al, Effect of synthesis conditions on physicochemical properties of zeolite SUZ-4, Journal of the Korean Chemical Society, (Oct. 2004) vol. 48 No. 6, 623-628 (Year: 2004).*

Vongcoradit et al, "Fast Crystallization of SUZ-4 zeolite with hydrothermal synthesis: part 1 Temperature and time effect", Procedia Engineering, 32 (2012) 198-204 (Year: 2012).*

Lawton et al, "synthesis and proposed framework topology of zeolite SUZ-4", J. Chem. Soc., Chem. Commun. (1993) 894-896 (Year: 1993).*

Turapan et al, "Synthesis and characterization of Fe/SUZ-4 zeolite", Procedia Engineering 32 (2012) 191-197 (Year: 2012).*

Zhou et al (2013), "Synthesis of SUZ-4 zeolite by a dry gel conversion method", Journal of Porous Materials, vol. 20, iss 3, 523-530, (Jun. 2013) (Year: 2013).*

* cited by examiner

JMZ-5 AND JMZ-6, ZEOLITES HAVING AN SZR-TYPE CRYSTAL STRUCTURE, AND METHODS OF THEIR PREPARATION AND USE

CROSS-REFERENCE TO RELATED APPLICATIONS

This is a continuation application of U.S. patent application Ser. No. 15/698,735, filed Sep. 8, 2017, which claims the benefit of and priority to U.S. Provisional Application No. 62/385,288, filed on Sep. 9, 2016, both of which are incorporated herein by reference.

FIELD OF INVENTION

The present invention relates to JMZ-5, an aluminosilicate molecular sieve having an SZR-type structure and a sea urchin type morphology, and a calcined product (JMZ-5C) formed from JMZ-5. The present invention also relates to JMZ-6, an aluminosilicate molecular sieve having an SZR-type crystal structure and needle-aggregate-type morphology, and a calcined product (JMZ-6C) formed from JMZ-6. The invention also relates to compositions and article comprising these materials, methods of their preparation and methods of their use as catalysts.

BACKGROUND OF THE INVENTION

Zeolites are crystalline or quasi-crystalline aluminosilicates constructed of repeating $TO_4$ tetrahedral units with T being most commonly Si, Al or P (or combinations of tetrahedral units). These units are linked together to form frameworks having regular intra-crystalline cavities and/or channels of molecular dimensions. Numerous types of synthetic zeolites have been synthesized and each has a unique framework based on the specific arrangement of the tetrahedral units. By convention, each topological type is assigned a unique three-letter code (e.g., "SZR") by the International Zeolite Association (IZA).

Zeolites have numerous industrial applications, and zeolites of certain frameworks, such as CHA, are known to be effective catalyst for treating combustion exhaust gas in industrial applications including internal combustion engines, gas turbines, coal-fired power plants, and the like. In one example, nitrogen oxides ($NO_x$) in the exhaust gas may be controlled through a so-called selective catalytic reduction (SCR) process whereby $NO_x$ compounds in the exhaust gas are contacted with a reducing agent in the presence of a zeolite catalyst.

Synthetic zeolites of the SZR topological type when prepared as aluminosilicate compositions are produced using structure-directing agents (SDAs), also referred to as a "templates" or "templating agents". The SDAs that are used in the preparation of aluminosilicate SZR topological-type materials are typically complex organic molecules, which guide or direct the molecular shape and pattern of the zeolite's framework. Generally, the SDA can be considered as a mold around which the zeolite crystals form. After the crystals are formed, the SDA is removed from the interior structure of the crystals, usually by heating in air, leaving a molecularly porous aluminosilicate material.

SUZ-4 zeolite was first reported by S. A. Barri, U.S. Pat. No. 5,118,483 (1992). In typical synthesis techniques ((1) Gao, S.; Wang, X.; Chu, W. The first study on the synthesis of uniform SUZ-4 zeolite nanofiber. *Microporous and Mesoporous Materials* 2012, 159, 105-110; (2) Gao, S.; Wang, X.; Wang, X.; Bai, Y. Green synthesis of SUZ-4 zeolite controllable in morphology and $SiO_2/Al_2O_3$ ratio. *Microporous and Mesoporous Materials* 2013, 174, 108-116; and (3) Vongvoradit, P.; Worathanakul, P. Fast Crystallization of SUZ-4 Zeolite with Hydrothermal Synthesis: Part I Temperature and Time Effect. *Procedia Engineering* 2012, 32, 198-204), solid zeolite crystals precipitate from a reaction mixture which contains the framework components (e.g., a source of silica and a source of alumina), a source of hydroxide ions (e.g., NaOH or KOH), and an SDA. Such synthesis techniques usually take several days (depending on factors such as crystallization temperature) to achieve the desired crystallization. When crystallization is complete, the solid precipitate containing the zeolite crystals is separated from the mother liquor, which is discarded. This discarded mother liquor contains unused SDA, which is often degraded, and unreacted silica.

SUZ-4 has a needle-shaped morphology. (Lawton, S. L., Bennett, J. M., Schlenker, J. L. and Rubin, M. K., Synthesis and proposed framework topology of zeolite SUZ-4, *Chem. Commun.*, 894-896 (1993)) and (Strohmaier, K. G., Afeworki, M. and Dorset, D. L., The crystal structures of polymorphic SUZ-4, *Z. Kristallogr.*, 221, 689-698 (2006)).

Concerns have been raised about the use of aluminosilicates having needle-like morphology due to similarities with asbestosis. For example, erionite is a natural zeolite having an ERI framework type. The morphology of erionite has been classified as being: single crystals as hexagonal prisms terminated by a pinacoid with sizes under 3 mm (IZA Commission on Natural Zeolites). It has been shown that exposure to erionite can result in a potential health hazard because, compared to other mineral particles, erionite has been shown to have greater pathogenicity than asbestos. (Michele Mattioli, Matteo Giordani, Meral Dogan, Michela Cangiotti, Giuseppe Avella, Rodorico Giorgi A. Umran Dogan, and Maria Francesca Ottaviani; Morpho-chemical characterization and surface properties of carcinogenic zeolite fibers; Journal of Hazardous Materials 306 (2016) 140-148) (Elizabeth A. Oczypok, Matthew S. Sanchez, Drew R. Van Orden, Gerald J. Berry, Kristina Pourtabib, Mickey E. Gunter, Victor L. Roggli, Alyssa M. Kraynie, and Tim D. Oury; Erionite-associated malignant pleural mesothelioma in Mexico; Int J Clin Exp Pathol 2016; 9(5):5722-5732.)

One potential method to address concerns related to the morphology of an aluminosilicate having a specific framework type is to develop a form having a different morphology while maintaining the same framework type. (U.S. Pat. No. 5,961,951A; Kennedy, C. L.; Rollmann, L. D.; Schlenker, J. L. Synthesis ZSM-48. 1999.) (U.S. Pat. No. 6,923,949 B1; Lai, W. F.; Saunders, R. B.; Mertens, M. M.; Verduijn, J. P. Synthesis of ZSM-48 crystals with heterostructural, non ZSM-48, seeding. 2005)

There is a need to develop new zeolites having the basic structure of known zeolites, where minor changes in the product morphology can affect one or more of the properties of the zeolite. In some cases, while minor changes in the morphology may not be discernable using commonly used analytical techniques, the catalytic activity of the modified zeolite may be improved relative to very closely related analogous zeolites. Unexpected improvements in the catalytic activity of such morphologically modified zeolites can allow for the compositions of exhaust gases from engines to meet various regulatory requirements.

SUMMARY OF THE INVENTION

In a first aspect of the invention, provided is a novel zeolite, JMZ-5, an aluminosilicate comprising a SZR structure and having an acicular, also referred to as a sea-urchin, type morphology.

In a second aspect of the invention, provided is a calcined product (JMZ-5C) formed from JMZ-5.

In a third aspect of the invention, provided is a novel zeolite, JMZ-6, an aluminosilicate comprising a SZR structure and having a needle-aggregate type morphology.

In a fourth aspect of the invention, provided is a calcined product (JMZ-6C) formed from JMZ-6.

In a fifth aspect of the invention, provided are catalytic compositions comprising JMZ-5C, a metal impregnated JMZ-5C, JMZ-6C, a metal impregnated JMZ-6C, or a mixture thereof.

In a sixth aspect of the invention, provided are articles comprising JMZ-5C, a metal impregnated JMZ-5C, JMZ-6C, a metal impregnated JMZ-6C or a mixture thereof.

In a seventh aspect of the invention, provided is a method for forming JMZ-5 by using faujasite as a source of silica and aluminum in the reaction mixture used to form JMZ-5.

In an eighth aspect of the invention, provided is a method for forming JMZ-5 by using specific calcined seeds in the reaction mixture used to form JMZ-5.

In a ninth aspect of the invention, provided is a method for forming JMZ-6 by using specific as-made seeds in the reaction mixture used to form JMZ-6.

In a tenth aspect of the invention, provided is a method for forming JMZ-5C by calcining JMZ-5 or forming JMZ-6C by calcining JMZ-6.

In an eleventh aspect of the invention, provided is a method for treating an exhaust gas from an engine by contacting the exhaust gas with one or more of JMZ-5C, a metal impregnated JMZ-5C, JMZ-6C or a metal impregnated JMZ-6C.

DETAILED DESCRIPTION OF THE INVENTION

As used in this specification and the appended claims, the singular forms "a", "an" and "the" include plural referents unless the context clearly indicates otherwise. Thus, for example, reference to "a catalyst" includes a mixture of two or more catalysts, and the like.

The term "SZR" refers to an SZR topological type as recognized by the International Zeolite Association (IZA) Structure Commission. The term "comprising an SZR type framework" means the material having a primary crystalline phase that is SZR. Other crystalline phases may also be present, but the primary crystalline phase comprises at least about 90 weight percent SZR, preferably at least about 95 weight percent SZR, and even more preferably at least about 97 or at least about 99 weight percent SZR. Preferably, the SZR molecular sieve is substantially free of other crystalline phases and is not an intergrowth of two or more framework types. By "substantially free" with respect to other crystalline phases, it is meant that the molecular sieve contains at least 99 weight percent SZR.

The terms "BEA", "CHA" and "LTA" refer to topological types beta zeolite, chabazite and zeolite A (also known as Linde Type A), respectively.

The term "calcine", or "calcination", means heating the material in air, oxygen or an inert atmosphere. Calcination is performed to decompose a metal salt, promote the exchange of metal ions within the catalyst, to adhere the catalyst to a substrate and to remove the SDA from the micropores of the materials prepared herein.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

Figure 1:
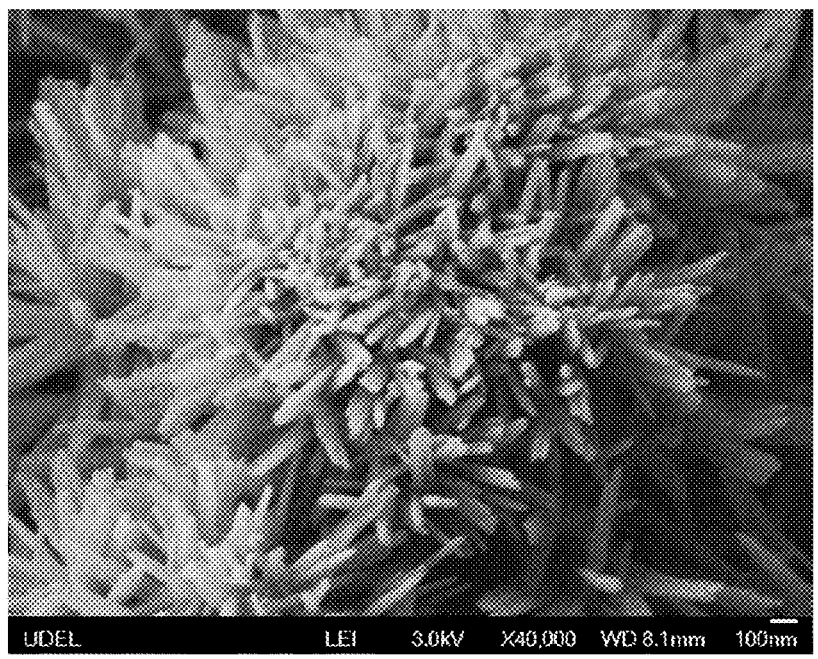
FIG. 1 is an SEM showing the acicular, also referred to as a sea urchin, morphology of JMZ-5.

The term "acicular", also referred to as "sea urchin" means that a plurality of needle-shaped crystals having two ends are joined together at only one of the ends in a central location. This type of morphology can also be described as a bundle of radiating needles. An SEM of JMZ-5 showing the sea urchin shape is shown in FIG. 1, where small needles grow out of a spherical core with approximately radial directions.

Figure 2:
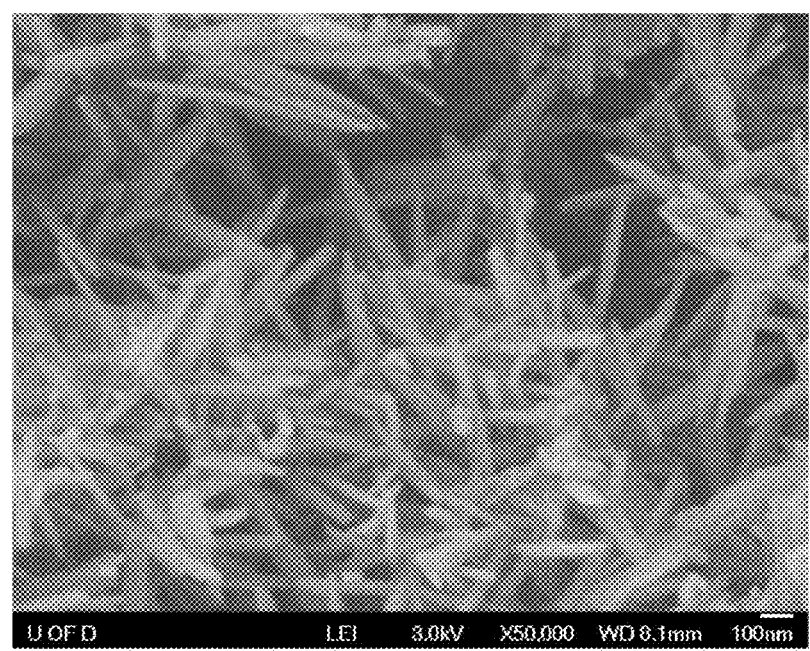
FIG. 2 is an SEM showing the needle aggregate morphology of JMZ-6.

The term "needle aggregate" refers to clusters of needle-like crystals that extend in multiple directions and do not radiate from a central area. An SEM of JMZ-5 showing the needle aggregate shape is shown in FIG. 2 where the needles are observed to be present in a variety of directions but do not emanate from a central area.

As used herein the term "zeolite" means an aluminosilicate molecular sieve having a framework constructed of alumina and silica (i.e., repeating $SiO_4$ and $AlO_4$ tetrahedral units). Under special synthesis conditions, zeolites can be 'siliceous' meaning that aluminum is only present as an impurity.

The zeolites of the present invention are not silicoaluminophosphates (SAPOs) and thus do not have an appreciable amount of phosphorous in their framework. That is, the zeolite frameworks do not have phosphorous as a regular repeating unit and/or do not have an amount of phosphorous that would affect the basic physical and/or chemical properties of the material, particularly with respect to the material's capacity to selectively reduce $NO_x$ over a broad temperature range. The amount of framework phosphorous can be less than about 1 weight percent, preferably less than 0.1 weight percent, most preferably less than 0.01 weight percent, based on the total weight of the zeolite.

Zeolites, as used herein, are free or substantially free of framework atoms or T-atoms, other than silicon and aluminum. Thus, a "zeolite" is distinct from a "metal-substituted zeolite", wherein the latter comprises a framework that contains one or more non-aluminum metals substituted into the zeolite's framework. The zeolite framework, or the zeolite as a whole, can be free or essentially free of transition metals, including copper, nickel, zinc, iron, tungsten, molybdenum, cobalt, titanium, zirconium, manganese, chromium, vanadium, niobium, as well as tin, bismuth, and antimony; is free or essentially free of noble metals including platinum group metals (PGMs), such as ruthenium, rhodium, palladium, indium, platinum, and precious metals such as gold and silver; and is free or essentially free of rare earth metals such as lanthanum, cerium, praseodymium, neodymium, europium, terbium, erbium, ytterbium, and yttrium. The zeolites of the present invention may contain low levels of iron: the iron may be in a framework tetrahedral site and/or as a cationic species. The amount of iron in a framework tetrahedral site and/or as a cationic species following synthesis is usually less than about 0.1 weight percent.

In a first aspect of the invention, provided is a novel zeolite, JMZ-5, an aluminosilicate comprising a SZR type framework structure and having a sea-urchin type morphology.

JMZ-5 has an X-ray powder diffraction pattern substantially similar to that of an SZR type framework. "Substantially similar" means the patterns are qualitatively the same with regard to the locations of the peaks. One skilled in the art would be able to determine if two materials have similar X-ray diffraction patterns.

JMZ-5 can have a silica to alumina ratio (SAR) of 15 to 40, preferably 15 to 32, more preferably 15 to 25, even more preferably 15 to 20.

JMZ-5 further comprises a structure-directing agent. Preferably the structure-directing agent comprises tetraethylammonium cations, N',N',N',N',N',N'-hexaethylpentanediammonium cations or quinuclidine. When tetraethylammonium cations are being used, the absence or near absence of $Na^+$ in the synthesis mixture has been reported to be important for SUZ-4 crystallization to proceed in the $TEA^+$ system" (Amit C. Gujar, Geoffrey L. Price; Synthesis of SUZ-4 in the K+/TEA+ system. 2002).

In a second aspect of the invention, provided is a calcined product (JMZ-5C) formed from JMZ-5.

JMZ-5C is a calcined aluminosilicate molecular sieve comprising a SZR type framework and having a sea-urchin type crystal morphology. The XRD pattern of the JMZ-5C is similar to other zeolites having an SZR type structure.

JMZ-5C is useful as a catalyst in certain applications. Dried JMZ-5 crystals are preferably calcined, but can also be used without calcination.

JMZ-5C can be used either without a post-synthesis metal exchange or with a post-synthesis metal exchange, preferably with a post-synthesis metal exchange.

JMZ-5C can be free or essentially free of any exchanged metal, particularly post-synthesis exchanged or impregnated metals.

JMZ-5C can further comprise one or more catalytic metal ions exchanged or otherwise impregnated into the channels and/or cavities of the zeolite. A metal in these positions are also known as extra-framework metal cations. The extra-framework metal cation can be an alkali metal cation, an alkaline earth metal cation, a transition metal cation or a mixture thereof.

Examples of metals that can be post-zeolite synthesis exchanged or impregnated include transition metals, including copper, nickel, zinc, iron, tungsten, molybdenum, cobalt, titanium, zirconium, manganese, chromium, vanadium, niobium, as well as the main group metals tin, bismuth, and antimony; noble metals including platinum group metals (PGMs), such as ruthenium, rhodium, palladium, indium, platinum, and precious metals such as gold and silver; alkaline earth metals such as barium, beryllium, calcium, magnesium, and strontium; and rare earth metals such as cerium, erbium, europium, lanthanum, neodymium, praseodymium, terbium, ytterbium, and yttrium.

Preferably, the extra-framework metal comprises calcium, cerium, cobalt, copper, chromium, iron, lithium, manganese, nickel, potassium, sodium, strontium or a combination of two or more of these metals. More preferably, the extra-framework metal comprises copper, iron, manganese or a combination of two or more of these metals.

These metals can be present in an amount of about 0.1 to about 10 weight percent, for example about 0.5 to about 5 weigh percent, about 0.1 to about 1.0 weight percent, about 2.5 to about 3.5 weight percent, and about 4.5 to about 5.5 weight percent, wherein the weight percent is relative to the total weight of the zeolite.

Particularly preferred exchanged metals include copper and iron, particularly when combined with calcium and/or cerium and particularly when the transition metals ($T_M$) and the alkaline metals ($A_M$) are present in a $T_M:A_M$ molar ratio of about 15:1 to about 1:1, for example about 10:1 to about 2:1, about 10:1 to about 3:1, or about 6:1 to about 4:1.

Metals incorporated post-synthesis can be added to the molecular sieve via any known technique such as ion exchange, impregnation, isomorphous substitution, etc.

These exchanged metal cations are distinct from metals constituting the molecular framework of the zeolite, and thus metal exchanged zeolites are distinct from metal-substituted zeolites.

In a third aspect of the invention, provided is a novel zeolite, JMZ-6, an aluminosilicate comprising a SZR structure and having needle-aggregate type morphology.

JMZ-6 has an X-ray powder diffraction pattern substantially similar to that of an SZR type framework.

JMZ-6 can have a silica to alumina ratio (SAR) of 10 to 30, preferably 15 to 25, more preferably 15 to 20.

JMZ-6 further comprises a structure-directing agent. Preferably the structure-directing agent comprises tetraethylammonium cations, N',N',N',N',N',N'-hexaethylpentanediammonium cations or quinuclidine.

In a fourth aspect of the invention, provided is a calcined product (JMZ-6C) formed from JMZ-6.

JMZ-6C is a calcined aluminosilicate molecular sieve comprising a SZR type framework and having sea-urchin type crystal morphology. The XRD pattern of the JMZ-6C is similar to other zeolites having an SZR type structure.

JMZ-6C is useful as a catalyst in certain applications. Dried JMZ-6 crystals are preferably calcined, but can also be used without calcination.

JMZ-6C can be used either without a post-synthesis metal exchange or with a post-synthesis metal exchange, preferably with a post-synthesis metal exchange.

JMZ-6C can be free or essentially free of any exchanged metal, particularly post-synthesis exchanged or impregnated metals.

JMZ-6C can further comprise one or more catalytic metal ions exchanged or otherwise impregnated into the channels and/or cavities of the zeolite as described above for JMZ-5C.

JMZ-6C can further comprise an extra-framework metal. The extra-framework metal can be an alkali metal, an alkaline earth metal, a transition metal or a mixture thereof. Preferably, the extra-framework metal comprises calcium, cerium, cobalt, copper, chromium, iron, lithium, manganese, nickel, potassium, sodium, strontium or a combination of two or more of these metals. More preferably, the extra-framework metal comprises copper, iron, manganese or a combination of two of more of these metals.

In a fifth aspect of the invention, provided are catalytic compositions comprising JMZ-5C, JMZ-6C, or a mixture thereof.

Catalytic composition comprise JMZ-5C, JMZ-6C, or a mixture thereof, and one or more supports, such as alumina, a zeolite such as an aluminosilicate zeolite, silica, non-zeolite silica alumina, ceria, zirconia, titania or a mixed or composite oxide containing both ceria and zirconia.

One or more additional materials, such as fillers, binders, stabilizers, rheology modifiers, and other additives, can also be present in the composition.

The catalyst composition can comprise a catalyst comprising JMZ-5C, JMZ-6C, or a mixture thereof, where the catalyst comprises an extra-framework metal.

The extra-framework metal can be an alkali metal, an alkaline earth metal, a transition metal or a mixture thereof. Preferably, the extra-framework transition metal comprises one or more of calcium, cerium, cobalt, copper, chromium, iron, lithium, manganese, molybdenum, nickel, niobium, potassium, sodium, strontium, tantalum, tungsten, vanadium or a combination of two or more of these metals The extra-framework metal can comprise about 0.1 to about 10, preferably about 0.1 to about 5, weight percent of total weight of the molecular sieves, extra-framework metal and catalytically active metal in the catalyst. Preferably, the molecular sieve comprises about 0.1 to about 10, preferably about 0.1 to about 5, weight percent of copper, iron, manganese or a combination of two or more of these metals.

In a sixth aspect of the invention, provided are articles comprising JMZ-5C, JMZ-6C, or a mixture thereof.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. A washcoat containing the catalyst can be applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, a catalyst article can comprise an SZR catalyst described herein coated on and/or incorporated into a substrate.

Certain aspects of the invention provide a catalytic washcoat. The washcoat comprising a calcined product formed from JMZ-5 described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. The catalyst composition can comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc.

The binder can comprise cerium or ceria. When the binder contains cerium or ceria, the cerium containing particles in the binder are preferably significantly larger than the cerium containing particles in the catalyst.

The amount of washcoat deposited on a substrate is referred to as the washcoat loading. Preferably, the washcoat loading is >0.3 $g/in^3$, such as >1.2 $g/in^3$, >1.5 $g/in^3$, >1.7 $g/in^3$ or >2.00 $g/in^3$, and preferably <3.5 $g/in^3$, such as <2.5 $g/in^3$. The washcoat can be applied to a substrate in a loading of about 0.8 to 1.0 $g/in^3$, 1.0 to 1.5 $g/in^3$, or 1.5 to 2.5 $g/in^3$.

Two of the most common substrate designs to which catalyst may be applied are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, aluminum titanate, α-alumina, mullite, e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. The plate substrate can be constructed of metal, preferably corrugated metal.

A catalyst article can be made by a process described herein. The catalyst article can be produced by a process that includes the steps of applying one or more of JMZ-5C, a metal impregnated JMZ-5C, JMZ-6C or a metal impregnated JMZ-6C, preferably as a washcoat, to a substrate as a layer either before or after at least one additional layer of another composition for treating exhaust gas has been applied to the substrate. The one or more catalyst layers on the substrate, including the catalyst layer comprising one or more of JMZ-5C, a metal impregnated JMZ-5C, JMZ-6C or a metal impregnated JMZ-6C, are arranged in consecutive layers. As used herein, the term "consecutive" with respect to catalyst layers on a substrate means that each layer is contact with its adjacent layer(s) and that the catalyst layers as a whole are arranged one on top of another on the substrate.

One or more of JMZ-5C, a metal impregnated JMZ-5C, JMZ-6C or a metal impregnated JMZ-6C can be disposed on the substrate as a first layer or zone and another composition, such as an oxidation catalyst, reduction catalyst, scavenging component, or $NO_x$ storage component, can be disposed on the substrate as a second layer or zone. As used herein, the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. The second layer can be applied to an inert substrate as a bottom layer and the first layer is a top layer that is applied over the second layer as a consecutive series of sub-layers.

The exhaust gas can penetrate (and hence contact) the first layer, before contacting the second layer, and subsequently returns through the first layer to exit the catalyst component.

The first layer can be a first zone disposed on an upstream portion of the substrate and the second layer is disposed on the substrate as a second zone, wherein the second zone is downstream of the first.

A catalyst article can be produced by a process that includes the steps of applying one or more of JMZ-5C, a metal impregnated JMZ-5C, JMZ-6C or a metal impregnated JMZ-6C, preferably as a washcoat, to a substrate as a first zone, and subsequently applying at least one additional composition for treating an exhaust gas to the substrate as a second zone, wherein at least a portion of the first zone is downstream of the second zone. Alternatively, one or more of JMZ-5C, a metal impregnated JMZ-5C, JMZ-6C or a metal impregnated JMZ-6C can be applied, preferably as a washcoat, to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components can be designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. The substrate can be a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and exiting. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall.

Porosity is a measure of the fraction of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

Preferred wall-flow substrates are high efficiency filters. Wall flow filters for use with the present invention preferably have an efficiency of least 70%, at least about 75%, at least about 80%, or at least about 90%. The efficiency can be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

In general, the production of an extruded solid body, such as honeycomb flow-through or wall-flow filter, containing one or more of JMZ-5C, a metal impregnated JMZ-5C, JMZ-6C or a metal impregnated JMZ-6C involves blending one or more of these material, a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. JMZ-5C, a metal impregnated JMZ-5C, JMZ-6C or a metal impregnated JMZ-6C may also be washcoated or otherwise applied to the extruded solid body as one or more sub-layers that reside on the surface or penetrate wholly or partly into the extruded solid body.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Preferably, one or more of JMZ-5C, a metal impregnated JMZ-5C, JMZ-6C or a metal impregnated JMZ-6C is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The general procedures to forming JMZ-5 and JMZ-6 are described below

Methods for forming JMZ-5 and JMZ-6 use a structure-directing agent (SDA) comprising a tetraethylammonium cation as a structure-directing agent. The methods comprise the sequential steps of forming a reaction mixture and then reacting the mixture under hydrothermal conditions to form crystals containing the SDA and having an x-ray diffraction pattern consistent with that of SZR. The precipitated zeolite crystals are preferably separated from the subsequent mother liquor by any conventional technique, such as filtration.

JMZ-5 and JMZ-6 synthesized by the present methods may include one or more non-framework alkali and/or alkaline earth metals. These metals are typically introduced into the reaction mixture in conjunction with the source of hydroxide ions. Examples of such metals include sodium and/or potassium, and also magnesium, calcium, strontium, barium, lithium, cesium, and rubidium.

Usually it is desirable to remove the alkali metal cation by ion exchange and replace it with hydrogen, ammonium, or any desired metal ion. Accordingly, zeolites of the present invention may be a Na-form zeolite, a K-form zeolite, or a combined N, K-form and the like, or may be an H-form zeolite, an ammonium-form zeolite, or a metal-exchanged zeolite. Typical ion exchange techniques involve contacting the synthetic zeolite with a solution containing a salt of the desired replacing cation or cations. Although a wide variety of salts can be employed, chlorides and other halides, nitrates, sulfates and carbonates are particularly preferred. Representative ion exchange techniques are widely known in the art. Ion exchange occurs post-synthesis and can take place either before or after the zeolite is calcined. Following contact with the salt solution of the desired replacing cation, the zeolite is typically washed with water and dried at temperatures ranging from 65° C. to about 315° C., usually between 80° C. and 150° C. After washing, the zeolite can be calcined in an inert gas and/or air at temperatures ranging from about 315° C. to 850° C. for periods of time ranging from 1 to 48 hours, or more, to produce a catalytically active and stable product.

The reaction mixture used in the synthesis of JMZ-5 and JMZ-6 typically contains at least one source of silica, at least one source of alumina, at least one SDA useful in forming JMZ-5, and at least one source of hydroxide ions. In one of the two methods for synthesizing JMZ-5, faujasite (FAU) is used as the sole or predominant source of silicon and aluminum.

Preferably, the overall process will have an overall yield on silica of at least about 60%, for example at least about 70%, at least about 80%. Preferably, the overall process will have an overall yield on SDA of at least about 40%, for example at least about 60%, at least about 80%, at least about 90%, about 40-90%, about 40-60%, about 60-80%, about 80-90%, about 90-95%, or about 95-99%.

Suitable silica sources include, without limitation, fumed silica, silicates, precipitated silica, colloidal silica, silica gels, zeolites such as zeolite Y and/or zeolite X, and silicon hydroxides and alkoxides. Silica sources resulting in a high relative yield are preferred.

Typical alumina sources also are generally known and include aluminates, alumina, other zeolites such as faujasite (FAU), aluminum colloids, boehmites, pseudo-boehmites, aluminum hydroxides, aluminum salts such as aluminum sulfate and alumina chloride, aluminum hydroxides and alkoxides, alumina gels, and aluminum metal in foil or powder form.

Typically, a source of hydroxide ions such as an alkali metal hydroxide and/or an alkaline earth metal hydroxide, including hydroxide of sodium, potassium, lithium, cesium, rubidium, calcium, and magnesium, is used in the reaction mixture. However, this component can be omitted so long as the equivalent basicity is maintained. The SDA can be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

Salts, particularly alkali metal halides such as sodium chloride, can be added to or formed in the reaction mixture as well. Preferably, the reaction mixture is free or substantially free of fluorine, fluorine-containing compounds, and fluorine ions.

The reaction mixture can be in the form of a solution, a colloidal dispersion (colloidal sol), gel, or paste, with a gel being preferred. JMZ-5 can be prepared from a reaction mixture having the composition shown in Table 2. Silicon- and aluminum-containing reactants are expressed as $SiO_2$ and $Al_2O_3$, respectively.

TABLE 2

|  | Typical | Preferred |
| --- | --- | --- |
| $SiO_2/Al_2O_3$ | 10-100 | 15-60 |
| $OH^-/SiO_2$ | 0.3-1.0 | 0.6-0.8 |
| $SDA/SiO_2$ | 0.05-0.50 | 0.10-0.20 |
| Alkali metal cation/$SiO_2$ | 0.10-1.0 | 0.15-0.35 |
| $H_2O/SiO_2$ | 10-80 | 15-40 |

Reaction temperatures, mixing times and speeds, and other process parameters that are suitable for conventional SZR synthesis techniques are also generally suitable for the present invention. Generally, the reaction mixture is maintained at an elevated temperature until the JMZ-5 crystals are formed. The hydrothermal crystallization is usually conducted under autogenous pressure, at a temperature between about 75-220° C., for example between about 120 and 160° C., for duration of several hours, for example, about 0.1-20 days, and preferably from about 0.25-3 days. Preferably, the zeolite is prepared using stirring or agitation.

During the hydrothermal crystallization step, when faujasite is used as the source of silicon and aluminum, crystals of JMZ-5 can be used to facilitate new crystals to nucleate spontaneously from the reaction mixture.

The use of JMZ-5 crystals as seed material can be advantageous in decreasing the time necessary for complete crystallization to occur and to minimize the formation of other crystalline impurities. When used as seeds, JMZ-5 crystals can be added in an amount between 0.1 and 10% of the weight of silica used in the reaction mixture.

When JMZ-5 is produced using non-SZR framework type crystals, or JMZ-6 is produced, other seed crystal are used, as described below.

Once the JMZ-5 or JMZ-6 crystals have formed, the solid product is separated from the reaction mixture by standard separation techniques such as filtration. The JMZ-5 or JMZ-6 crystals are water-washed and then dried, for several second to a few minutes (e.g., 5 second to 10 minutes for flash drying) or several hours (e.g., about 4-24 hours for oven drying at 75-150° C.), to obtain as-synthesized JMZ-5 or JMZ-6 crystals having a SZR framework type material and SDA within the crystals. The drying step can be performed at atmospheric pressure or under vacuum.

It will be appreciated that the foregoing sequence of steps, as well as each of the above-mentioned periods of time and temperature values are merely exemplary and may be varied.

The JMZ-5 crystals produced in accordance with the methods described herein can have a mean crystallite size of about 0.01 to about 5 μm, for example about 0.5 to about 5 μm, about 0.1 to about 1 μm, and about 1 to about 5 μm.

Large crystals can be milled using a jet mill or other particle-on-particle milling technique to an average size of about 1.0 to about 1.5 micron to facilitate washcoating a slurry containing the catalyst to a substrate, such as a flow-through monolith.

JMZ-5 synthesized by the methods described herein preferably have a silica-to-alumina ratio (SAR) of 15 to 40, preferably 20-32.

JMZ-6 synthesized by the methods described herein preferably have a silica-to-alumina ratio (SAR) of 10 to 30, preferably 15 to 25, more preferably 15 to 20.

The SAR can be selectively achieved based on the composition of the starting synthesis mixture and/or adjusting other process variables. The silica-to-alumina ratio of zeolites may be determined by conventional analysis. This ratio is meant to represent, as closely as possible, the ratio in the rigid atomic framework of the zeolite crystal and to exclude silicon or aluminum in the binder (for catalyst applications) or, in cationic or other form, within the channels.

In a seventh aspect of the invention, provided is a method for forming JMZ-5 by using faujasite as a source of silica and aluminum in the reaction mixture used to form JMZ-5.

The method for synthesizing JMZ-5 can comprise:

a. forming a reaction mixture comprising: (a) a source of silicon and aluminum, where the source of both silicon and aluminum is an aluminosilicate molecular sieve having a non-SZR type structure, and (b) a structure directing agent (SDA) comprising a tetraethylammonium cation, b. forming crystals comprising an SZR type framework and the structure directing agent by hydrothermally aging the reaction mixture formed in step a, and c. recovering at least a portion of the molecular sieve crystals from the mother liquor, where the molecular sieve crystals comprise JMZ-5.

The source of silicon and/or aluminum can further comprise one or more additional components, wherein the one or more additional components are present in an amount such that at least 80% of the silicon and/or aluminum is provided by the aluminosilicate molecular sieve which does not have the SZR type structure.

The molecular sieve that is the source of alumina and silica is one or more of faujasite (FAU), mordenite (MOR), zeolite P (GIS), and zeolite A (LTA).

The SDA can be associated with an anion selected from the group consisting of fluoride, chloride, bromide, iodide, hydroxide, acetate, sulfate, tetrafluoroborate, carboxylate, carbonate and bicarbonate, and nitrate.

The reaction mixture can be essentially free of fluoride.

The reaction mixture can further comprise a source of alkali metal (M), wherein the weight ratio of $SiO_2$:MOx (oxide of the alkali metal) is from 2 to 10, where M=Na, K, Ca, or Sr, and mixtures thereof.

The reaction mixture can further comprise a source of potassium.

The reaction mixture can be a gel having a molar compositional ratio of:

| | |
| --- | --- |
| $H_2O/SiO_2$ | 10-100 |
| $OH/SiO_2$ | 0.01-1 |
| $R/SiO_2$ | 0.05-0.5 |
| $Al_2O_3/SiO_2$ | 0.01-0.1 | wherein R is the SDA.

The invention also relates to a composition comprising the reaction mixture formed before hydrothermally treating the reaction mixture as described in the methods of making JMZ-5.

In an eighth aspect of the invention, provided is a method for forming JMZ-5 by using specific calcined seeds in the reaction mixture used to form JMZ-5.

The method for synthesizing JMZ-5 comprises:
a. forming a reaction mixture comprising: (a) at least one source of alumina, (b) at least one source of silica, and (c) a structure directing agent (SDA) comprising tetraethylammonium cations, N',N',N',N',N',N'-hexaethylpentanediammonium cations or quinuclidine,
b. adding calcined aluminosilicate molecular sieve seed crystals to the reaction mixture where the calcined aluminosilicate molecular sieve seed crystals are a non-SZR type,
c. forming crystals comprising an SZR type framework and the structure directing agent, and
d. recovering at least a portion of the molecular sieve crystals from the mother liquor.

The calcined aluminosilicate molecular sieve seed crystals can comprise one or more of calcined Al-CHA, calcined Al-AEI, calcined Al-AFX, calcined silica LTA, and calcined Al-LTA.

The seeds crystals can be present in the reaction mixture from about 0.1 to about 10% w/w of the total weight of the reaction mixture.

The seed crystals can comprise from 1 to 35 weight percent of at least one crystalline molecular sieve impurity.

The invention also relates to a composition comprising the reaction mixture formed before hydrothermally treating the reaction mixture as described in the methods of making JMZ-5.

In a ninth aspect of the invention, provided is a method for forming JMZ-6 by using as-made Al-LTA seeds in the reaction mixture used to form JMZ-6.

The method of forming JMZ-6 using specific as-made seeds in the reaction is the same as described above for forming JMZ-5 using non-SZR seeds, except that the seeds comprise an LTA type framework. A method for synthesizing JMZ-6 can comprise the steps of:
a. forming a reaction mixture comprising: (a) at least one source of alumina, (b) at least one source of silica, and (c) a structure directing agent (SDA) comprising tetraethylammonium cations, N',N',N',N',N',N'-hexaethylpentanediammonium cations or quinuclidine,
b. adding as-made aluminosilicate seed crystals having an LTA type framework to the reaction mixture,
c. forming crystals comprising an SZR type framework and the structure directing agent, and
d. recovering at least a portion of the molecular sieve crystals from the mother liquor, where the molecular sieve crystals comprise JMZ-6.

The seeds crystals can be present in the reaction mixture from about 0.1 to about 10% w/w of the total weight of the reaction mixture.

The seed crystals can comprise from 1 to 35 weight percent of at least one crystalline molecular sieve impurity.

The invention also relates to a composition comprising the reaction mixture formed before hydrothermally treating the reaction mixture as described in the methods of making JMZ-6.

In a tenth aspect of the invention, provided is a method for forming JMZ-5C by calcining JMZ-5 or forming JMZ-6C by calcining JMZ-6.

JMZ-5 and JMZ-6 each contain a structure-directing agent (SDA), also known as a template. The SDA can be removed by calcination, where JMZ-5 or JMZ-6 is heated under an oxidizing atmosphere, such as air or oxygen, a neutral atmosphere, such as nitrogen or other inert gas, or a reducing atmosphere, such as hydrogen. The atmosphere can be dry or can include water.

The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

The samples may be heated to a desired temperature where the rate of temperature change is constant or where the rate of temperature change is not constant.

The samples can also be heated and maintained for a length of time at two or more different temperatures, where the length of time the sample is held at each temperature can be the same or different.

In an eleventh aspect of the invention, provided is a method for treating an exhaust gas from an engine by contacting the exhaust gas with one or more of JMZ-5C, a metal impregnated JMZ-5C, JMZ-6C or a metal impregnated JMZ-6C and converting a portion of ammonia and NOx in an exhaust gas into nitrogen and water.

JMZ-5C, a metal impregnated JMZ-5C, JMZ-6C or a metal impregnated JMZ-6C can promote the reaction of a reductant, preferably ammonia, with nitrogen oxides to selectively form elemental nitrogen ($N_2$) and water ($H_2O$). Thus, the catalyst can be formulated to favor the reduction of nitrogen oxides with a reductant (i.e., an SCR catalyst).

Examples of such reductants include hydrocarbons (e.g., C3-C6 hydrocarbons) and nitrogenous reductants such as ammonia and ammonia hydrazine or any suitable ammonia precursor, such as urea (($NH_2)_2CO$), ammonium carbonate, ammonium carbamate, ammonium hydrogen carbonate or ammonium formate.

Preferably, JMZ-5C or JMZ-6C contains one or more metal ions, such as copper, iron or manganese. The one more metals may be impregnated into JMZ-5C or JMZ-6C. JMZ-5C, a metal containing JMZ-5C, JMZ-6 or a metal containing JMZ-6C can also promote the oxidation of ammonia.

The catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). JMZ-5C, a metal impregnated JMZ-5C, JMZ-6C or a metal impregnated JMZ-6C can be disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

SCR and AMOX operations can be performed in series, wherein both processes utilize a catalyst comprising the SZR catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. A catalyst article can have an ammonia slip catalyst disposed downstream of a selective catalytic reduction (SCR) catalyst. The ammonia slip catalyst can oxidize at least a portion of any nitrogenous reductant that is not consumed by the selective catalytic reduction process. The ammonia slip catalyst can be disposed on the outlet side of a wall flow filter and an SCR catalyst can be disposed on the upstream side of a filter. The ammonia slip catalyst can be disposed on the downstream end of a flow-through substrate and an SCR catalyst can be disposed on the upstream end of the flow-through substrate. The ammonia slip catalyst and SCR catalyst can be disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

The SCR and/or AMOX process can be performed at a temperature of at least 100° C., preferably at a temperature from about 150° C. to about 750° C., more preferably from about 175 to about 550° C., even more preferably from 175 to 400° C.

In some conditions, the temperature range can be from 450 to 900° C., preferably 500 to 750° C., more preferably 500 to 650° C., even more preferably 450 to 550° C. Temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_X$ compounds and/or oxidation of $NH_3$ in a gas, which comprises contacting the gas with JMZ-5C, a metal impregnated JMZ-5C, JMZ-6C or a metal impregnated JMZ-6C for a time sufficient to reduce the level of $NO_x$ compounds in the gas. Methods of the treating the exhaust gas may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All, or at least a portion of, the nitrogen-based reductant, particularly $NH_3$, for consumption in the SCR process can be supplied by a $NO_X$ adsorber catalyst (NAC), a lean $NO_X$ trap (LNT), or a $NO_X$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 grams/$ft^3$.

During periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. The method can be used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising JMZ-5C, described herein, and at least one additional component for treating the exhaust gas, wherein the catalytic article and at least one additional component are designed to function as a coherent unit.

A system can comprise a catalytic article comprising one or more of JMZ-5C, a metal impregnated JMZ-5C, JMZ-6C or a metal impregnated JMZ-6C; a conduit for directing a flowing exhaust gas; and a source of nitrogenous reductant disposed upstream of the catalytic article. The system can include a controller for metering the nitrogenous reductant into the flowing exhaust gas only when it is determined that JMZ-5C or a metal containing JMZ-5C is capable of catalyzing $NO_x$ reduction at or above a desired efficiency over a specific temperature range, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3$/$NO_2$.

The system can comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. The at least one platinum group metal can be platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

In another aspect of the invention, JMZ-5C, a metal impregnated JMZ-5C, JMZ-6C or a metal impregnated JMZ-6C can promote the formation of methylamines from reaction of methanol and ammonia.

In another aspect of the invention, provided is a method of converting an oxygenate, such as methanol, to an olefin (MTO) by contacting methanol with a calcined molecular sieve of the first aspect of the invention. The reaction process for the conversion of an oxygenate to olefin (OTO) is well known in the art. Specifically, in an OTO reaction process, an oxygenate contacts a molecular sieve catalyst composition under conditions effective to convert at least a portion of the oxygenate to light olefins. When methanol is the oxygenate, the process is generally referred to as a methanol to olefin (MTO) reaction process. Methanol is a particularly preferred oxygenate for the synthesis of ethylene and/or propylene.

A process for converting an oxygenate feed to a light olefin product comprises: a) providing an oxygenate feed comprising a majority of methanol; b) providing a catalyst composition comprising JMZ-5C, a metal impregnated JMZ-5C, JMZ-6C or a metal impregnated JMZ-6C and optionally a basic metal oxide co-catalyst; and c) contacting the oxygenate feed with the catalyst composition under conditions sufficient to convert at least a portion of the oxygenate feed to a light olefin product.

An oxygenate feedstock, particularly a mixed alcohol composition containing methanol and ethanol, is a useful feedstock for a variety of catalytic processes, particularly oxygenate to olefin (OTO) reaction processes, in which a catalyst composition, typically containing a primary oxide catalyst having at least two of Al, Si, and P (e.g., an aluminosilicate molecular sieve, preferably a high-silica aluminosilicate molecular sieve) and preferably a basic metal oxide co-catalyst, can be used to convert the oxygenate feedstock into a light olefin product, e.g., containing ethylene and/or propylene, preferably including ethylene. The olefins can then be recovered and used for further processing, e.g., in the manufacture of polyolefins such as polyethylene and/or polypropylene, olefin oligomers, olefin copolymers, mixtures thereof, and/or blends thereof.

One or more additional components can be included in the feedstock that is directed to the OTO reaction system. For example, a feedstock directed to the OTO reaction system can optionally contain, in addition to methanol and ethanol, one or more aliphatic-containing compounds such as alcohols, amines, carbonyl compounds for example aldehydes, ketones and carboxylic acids, ethers, halides, mercaptans, sulfides, and the like, and mixtures thereof. The aliphatic moiety of the aliphatic-containing compounds typically contains from 1 to 50 carbon atoms, preferably from 1 to 20 carbon atoms, more preferably from 1 to 10 carbon atoms, most preferably from 1 to 4 carbon atoms.

Non-limiting examples of aliphatic-containing compounds include: alcohols such as methanol, ethanol, n-propanol, isopropanol, and the like, alkyl-mercaptans such as methyl mercaptan and ethyl mercaptan, alkyl-sulfides such as methyl sulfide, alkyl amines such as methyl amine, alkyl ethers such as DME, diethyl ether and methyl ethyl ether, alkyl-halides such as methyl chloride and ethyl chloride, alkyl ketones such as dimethyl ketone, alkyl-aldehydes such as formaldehyde and acetaldehyde, and various organic acids such as formic acid and acetic acid.

The various feedstocks discussed above are converted primarily into one or more olefins. The olefins or olefin monomers produced from the feedstock typically have from 2 to 30 carbon atoms, preferably 2 to 8 carbon atoms, more preferably 2 to 6 carbon atoms, still more preferably 2 to 4 carbons atoms, and most preferably ethylene and/or propylene. Non-limiting examples of olefin monomer(s) include ethylene, propylene, butene-1, pentene-1,4-methyl-pentene-1, hexene-1, octene-1 and decene-1, preferably ethylene, propylene, butene-1, pentene-1,4-methyl-pentene-1, hexene-1, octene-1 and isomers thereof. Other olefin monomers can include, but are not limited to, unsaturated monomers, diolefins having 4 to 18 carbon atoms, conjugated or non-conjugated dienes, polyenes, vinyl monomers, and cyclic olefins.

A catalyst article for converting a low molecular weight oxygen containing species to an olefin rich hydrocarbon stream can comprise JMZ-5C, a metal impregnated JMZ-5C, JMZ-6C or a metal impregnated JMZ-6C, where one or more of these catalysts is disposed on a support and/or within a structure.

A catalyst article for converting a low molecular weight oxygen containing species to an aromatic rich hydrocarbon stream can comprise JMZ-5C, a metal impregnated JMZ-5C, JMZ-6C or a metal impregnated JMZ-6C, where one or more of these catalysts is disposed on a support and/or within a structure.

The catalyst can be incorporated or mixed with other additive materials. Such an admixture is typically referred to as formulated catalyst or as catalyst composition. Preferably, the additive materials are substantially inert to conversion reactions involving dialkyl ethers (e.g., dimethyl ether) and/or alkanols (e.g., methanol, ethanol, and the like).

One or more other materials can be mixed with JMZ-5C, a metal impregnated JMZ-5C, JMZ-6C or a metal impregnated JMZ-6C, particularly a material that is resistant to the temperatures and other conditions employed in organic conversion processes. Such materials can include catalytically active and inactive materials and synthetic or naturally occurring zeolites, as well as inorganic materials such as clays, silica, and/or other metal oxides such as alumina. The latter may be either naturally occurring or in the form of gelatinous precipitates or gels including mixtures of silica and metal oxides. Use of a catalytically active material can tend to change the conversion and/or selectivity of the catalyst in the oxygenate conversion process. Inactive materials suitably can serve as diluents to control the amount of conversion in the process so that products can be obtained in an economic and orderly manner without employing other means for controlling the rate of reaction. These materials can be incorporated into naturally occurring clays, e.g., bentonite and kaolin, to improve the crush strength of the catalyst under commercial operating conditions. The materials (e.g., clays, oxides, etc.) can function as binders for the catalyst. It can be desirable to provide a catalyst having good crush strength, because, in commercial use, it can be desirable to prevent the catalyst from breaking down into powder-like materials.

Naturally occurring clays that can be employed can include, but are not limited to, the montmorillonite and kaolin family, which families include the subbentonites, and the kaolins commonly known as Dixie, McNamee, Georgia and Florida clays, or others in which the main mineral constituent includes halloysite, kaolinite, dickite, nacrite, or anauxite. Such clays can be used in the raw state as originally mined or initially subjected to calcination, acid treatment, or chemical modification. Other useful binders can include, but are not limited to, inorganic oxides such as silica, titania, beryllia, alumina, and mixtures thereof.

In addition to the foregoing materials, JMZ-5C, a metal impregnated JMZ-5C, JMZ-6C or a metal impregnated JMZ-6C can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

The relative proportions of JMZ-5C, a metal impregnated JMZ-5C, JMZ-6C or a metal impregnated JMZ-6C and an inorganic oxide matrix can vary widely. For example, a mixture can include a zeolite content ranging from about 1 to about 90 percent by weight and more usually, particularly when the composite is prepared in the form of beads, in the range from about 2 to about 80 weight percent of the composite.

The invention also relates to C2, C3, C4 and C5 products formed by OTO or MTO application using JMZ-5C, a metal impregnated JMZ-5C, JMZ-6C or a metal impregnated JMZ-6C as a catalyst or co-catalyst.

EXAMPLES

Materials produced in the examples described below were characterized by one or more of the following analytic methods. Powder X-ray diffraction (PXRD) patterns were collected on a X'pert powder diffractometer (Philips) using a CuKα radiation (45 kV, 40 mA) at a step size of 0.04° and a 1 s per step between 5° and 40° (2θ). Scanning electron microscopy (SEM) images and chemical compositions by energy-dispersive X-ray spectroscopy (EDX) were obtained on a JSM7400F microscope (JEOL) with an accelerating voltage of 3-10 KeV. The micropore volume and surface area were measured using $N_2$ at 77 K on a 3Flex surface characterization analyzer (Micrometrics).

Example 1. Synthesis of SZR

SZR zeolite was prepared by the hydrothermal technique similar to that reported in Gao, S.; Wang, X.; Chu, W. The first study on the synthesis of uniform SUZ-4 zeolite nanofiber. *Microporous and Mesoporous Materials* 2012, 159, 105-110.

An aluminosilicate gel having a molar composition:

21.22 $SiO_2$:$Al_2O_3$:7.9 KOH:2.6 TEAOH:498.6 $H_2O$ was prepared by first dissolving 1.19 g of KOH pellet (85 wt %) in 14.37 g of deionized water. 0.12 g of Al powder was added to the stirred solution. After complete dissolution of Al powder, another solution containing 7.29 g Ludox AS-40, and 2.5 g tetraethylammounium hydroxide (25 wt %) was added to the mixture and stirring was continued for 3 h or until a homogeneous gel was obtained. The resulting aluminosilicate gel was then transferred to an autoclave reactor and reacted at 150° C. under 45 rpm rotation for 4 days. The reaction mixture had a silicon:aluminum ratio of 10.6.

The oven was cooled, the reactor was opened and the resulting material was separated by filtration, with the addition of de-mineralised water. After the initial mixing with water and the removal of the water, the procedure was repeated two additional times (three washes in total) following which resulting product was dried overnight at 80° C. and the as-made product was formed. A sample of the as-made product was calcined by heating the sample from room temperature to 150° C. at a 1 C/min heating rate, holding the sample at 150° C. for 3 h, increasing the temperature to 550° C. at a heating rate of 1° C./min and maintaining the temperature at 550° C. for 6 h.

Figure 3:
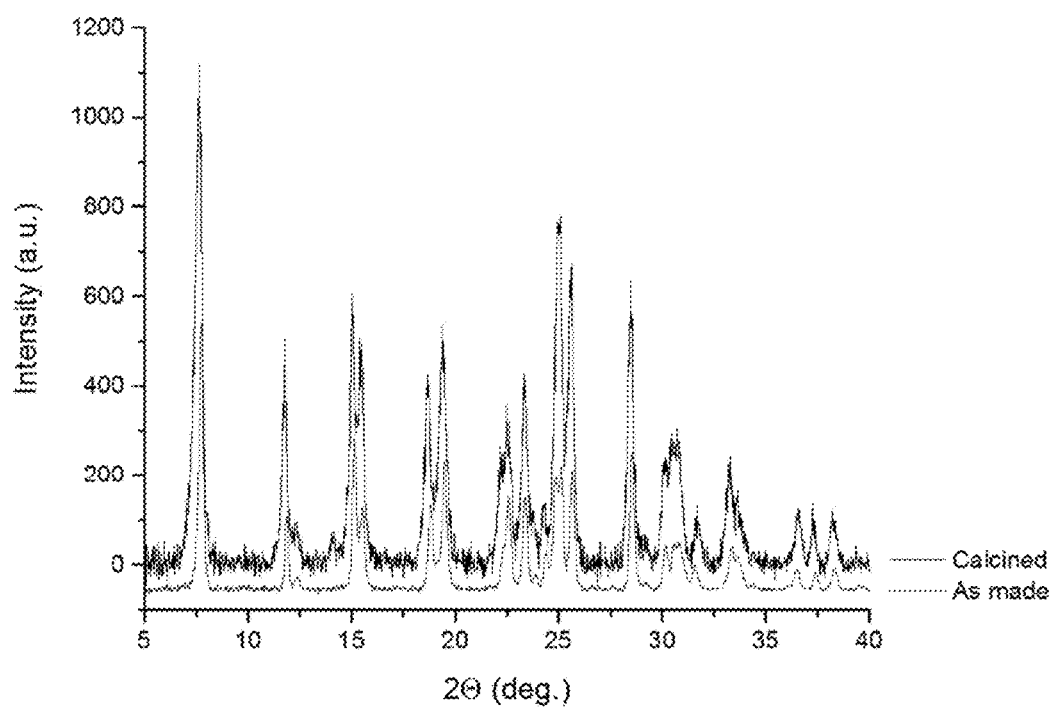
FIG. 3 is an XRD pattern of samples of as-made and calcined SZR, as prepared in Example 1.
Figure 4:
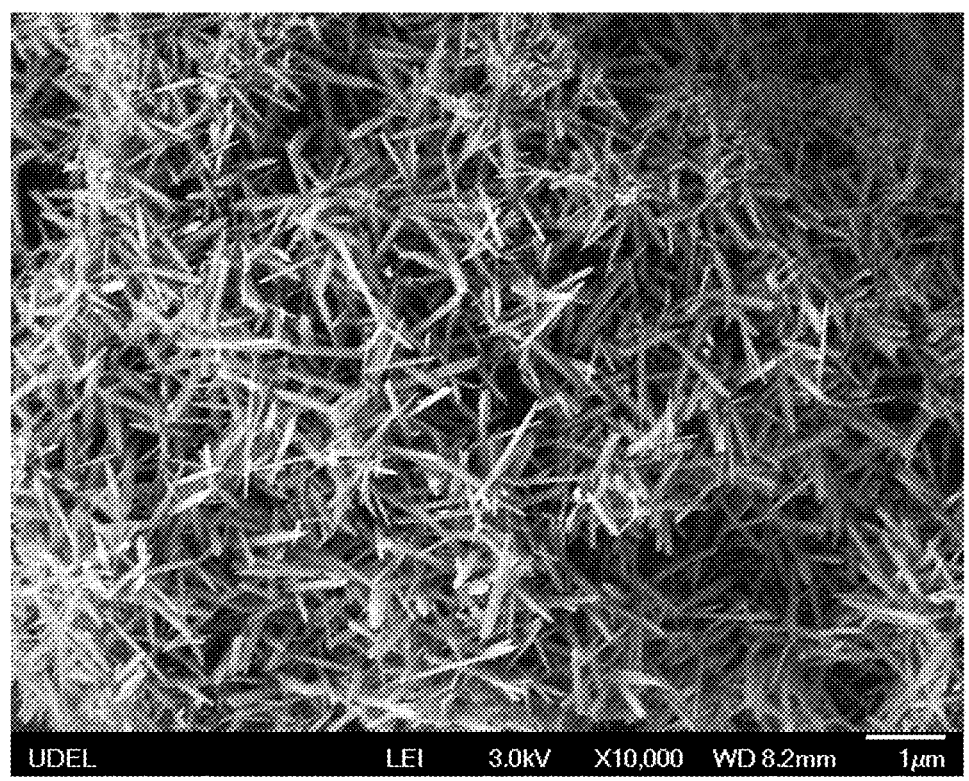
FIG. 4 is an SEM of a calcined sample of SZR, as prepared in Example 1.

Samples of the dried product were analysed by XRD and SEM as described above. Analysis of the both the as-made and calcined products by powder XRD (FIG. 3) indicated that both of these products had an SZR structure when compared to values in the literature. An SEM of the calcined product (FIG. 4) showed that the material had a needle-like morphology, as was known for SUZ-4. The product had a BET surfaces area of 299 $m^2/g$ and a pore volume of 0.13 $cm^3/g$.

Figure 5:
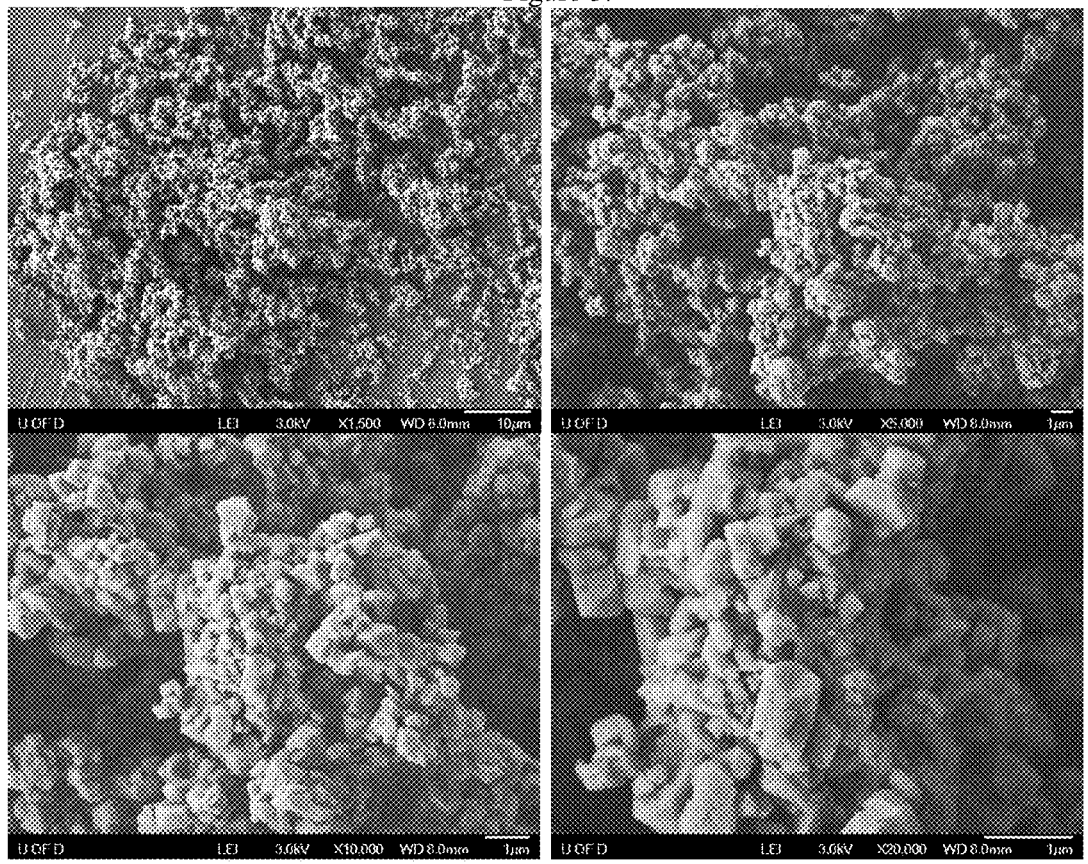
FIG. 5 is an SEM of a sample of FAU used as the silicon and aluminum source in preparing JMZ-5 as described in Example 2.

Example 2. Synthesis of JMZ-5 Using Faujasite as the Source of Silicon and Aluminum The procedure in Example 1 was changed by replacing Ludox AS-40 and Al metal powder as the silica and aluminum sources with commercially available faujasite zeolite having an SAR of 30 (CBV 720, Zeolyst). SEM of the faujasite is shown in FIG. 5. The reaction gel had a composition of:

30 $SiO_2$:$Al_2O_3$:11.2 KOH:3.7 TEAOH:704.9 $H_2O$.

The reaction mixture had a silicon:aluminum ratio of 15. The reaction gel was reacted for 4 days.

Figure 6:
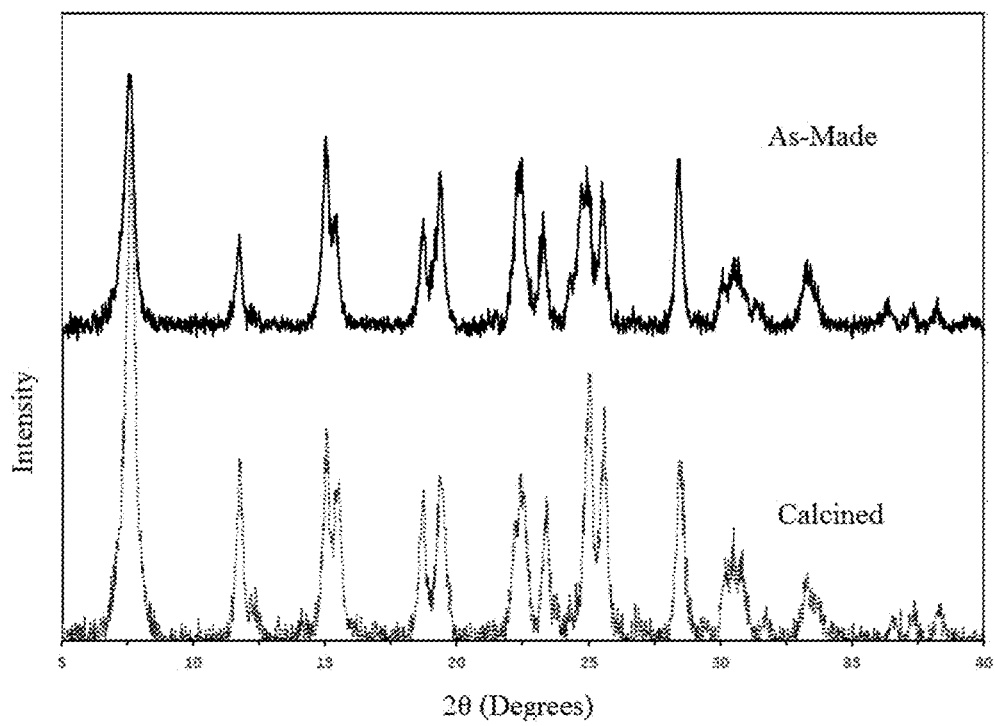
FIG. 6 is an XRD pattern of samples of as-made and calcined JMZ-5 prepared using FAU as the Si and Al source as described in Example 2.
Figure 7:
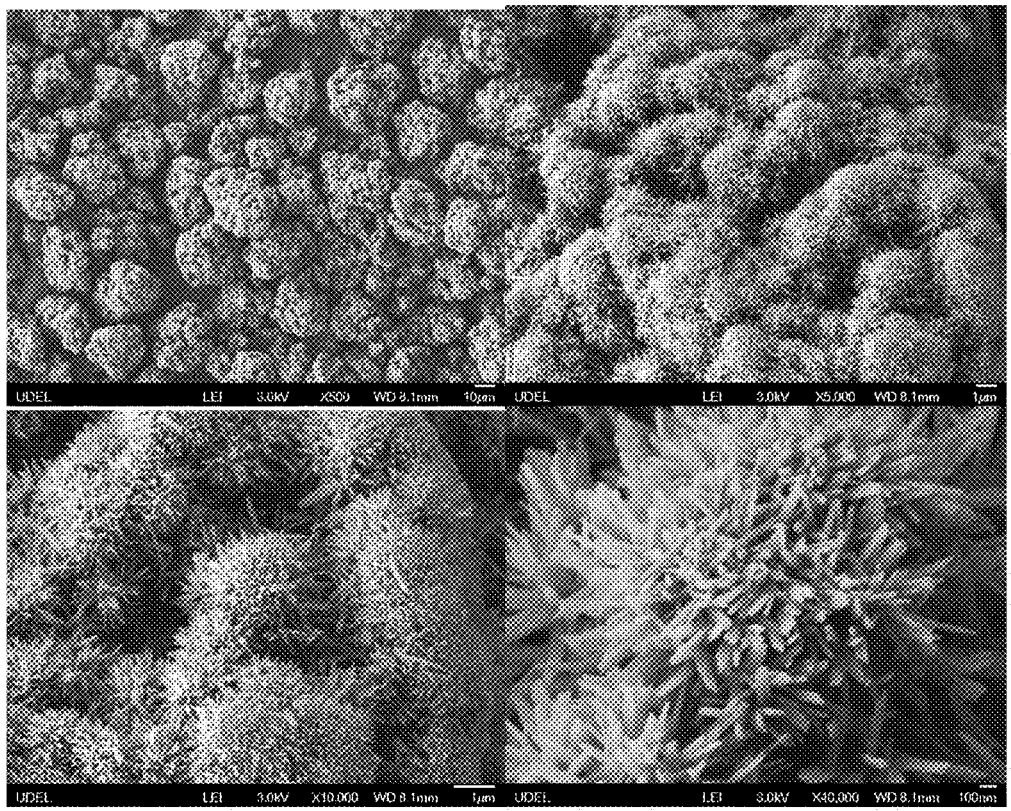
FIG. 7 is an SEM of a sample of calcined JMZ-5 prepared using FAU as the Si and Al source as described in Example 2.

Analysis of the dried powder by powder XRD (FIG. 6) indicated that the product was had an SZR crystal structure. SEM of the calcined powder (FIG. 7) showed that the product (JMZ-5) had a sea-urchin morphology.

Example 3. Synthesis of JMZ-5 Using Calcined Aluminosilicate CHA Seeds

Figure 8:
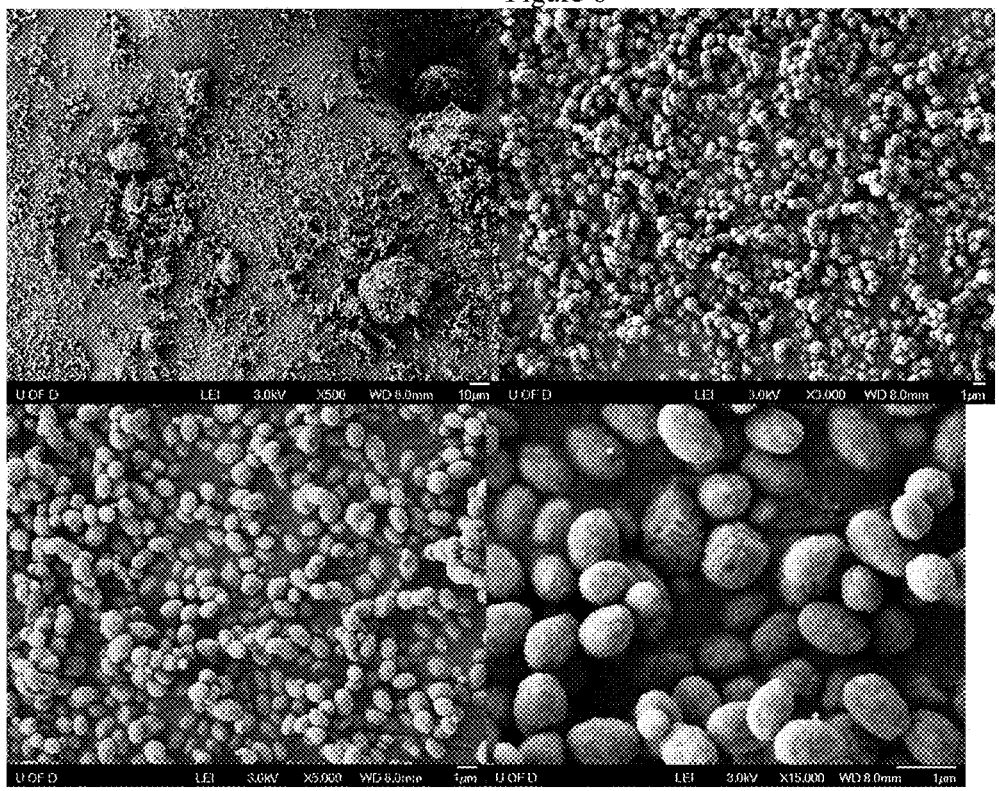
FIG. 8 is an SEM of a sample of CHA used as seeds in preparing JMZ-5 as described in Example 3.

The procedure in Example 1 was modified by the addition of calcined aluminosilicate CHA seeds (5 wt % of the total amount of silica in the reaction mixture (not including the seeds) to the reaction mixture after all of the other components had been added. SEM of the calcined aluminosilicate CHA seeds is shown in FIG. 8. The final reaction gel had a composition of:

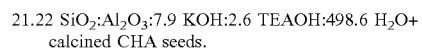
21.22 $SiO_2$:$Al_2O_3$:7.9 KOH:2.6 TEAOH:498.6 $H_2O$+ calcined CHA seeds.

The reaction gel was reacted for 8 days.

Figure 9:
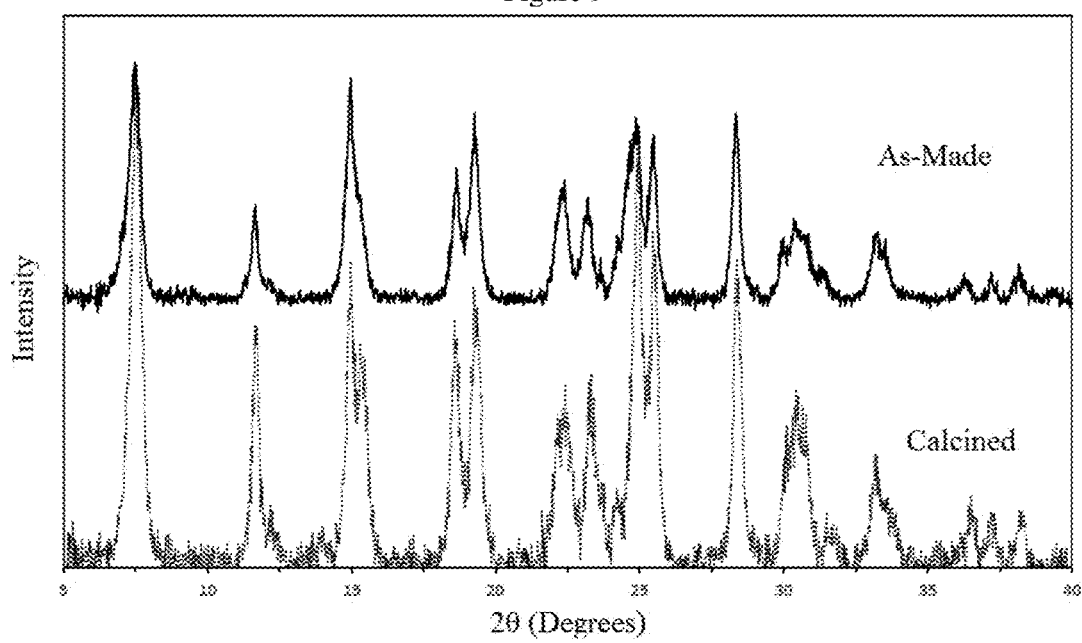
FIG. 9 is an SEM of calcined JMZ-5 made using CHA seeds as described in Example 3.
Figure 10:
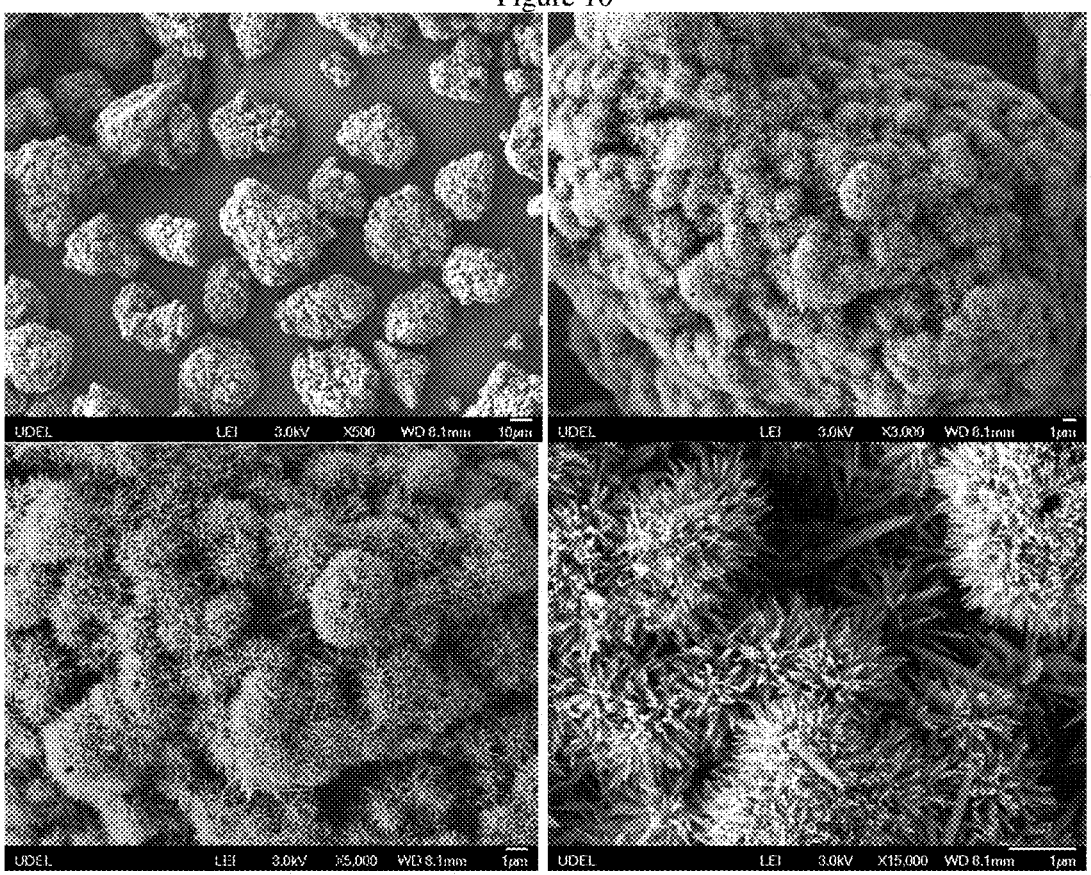
FIG. 10 is an XRD pattern of as-made and calcined JMZ-5 made using CHA seeds as described in Example 3.

Analysis of the dried product by powder XRD (FIG. 9) indicated that the product had SZR crystal structure. SEM of the calcined powder shows that the material produced using calcined aluminosilicate seeds had sea urchin morphology (FIG. 10), as was JMZ-5.

Figure 11:
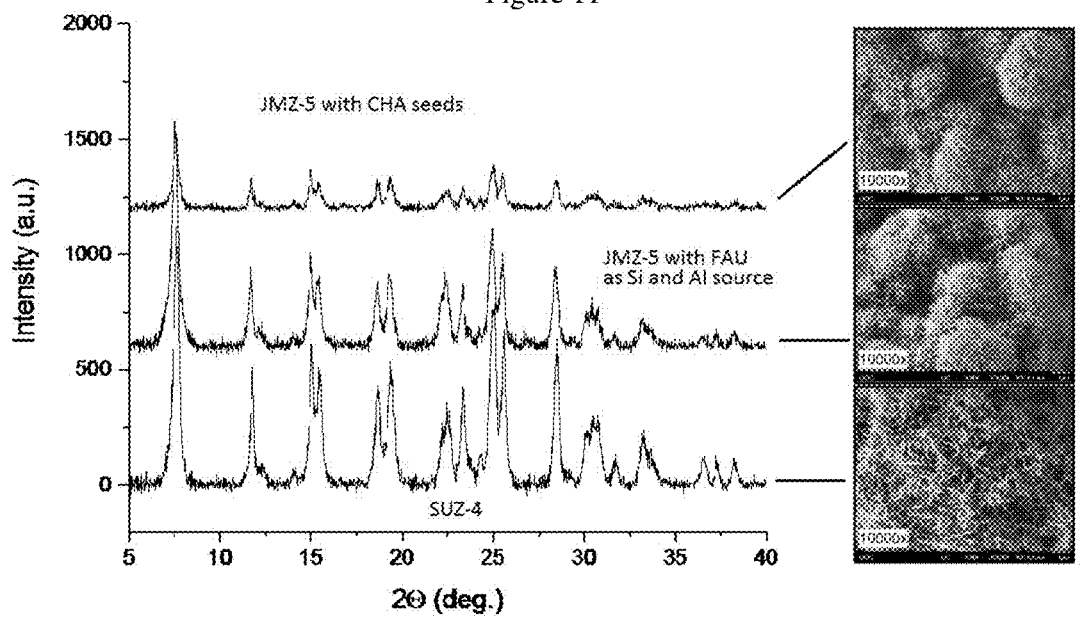
FIG. 11 is a graph of the XRD pattern of SZR, JMZ-5 made using FAU as the silicon and aluminum source, and JMZ-5 made using CHA seeds, as the crystal morphology corresponding to each of these materials.

FIG. 11 shows the XRD and SEM spectra of JMZ-5 made using CHA seeds, JMZ-5 made using FAU as the source of silicon and aluminium and SZR. The XRD spectra of JMZ-5 contains the same peaks as SZR, but the SEMs show that the morphology of JMZ-5 (sea urchin type) is distinct from that of SZR (needles)

Example 4. Synthesis of JMZ-5 Using Calcined Silica CHA Seeds

Figure 12:
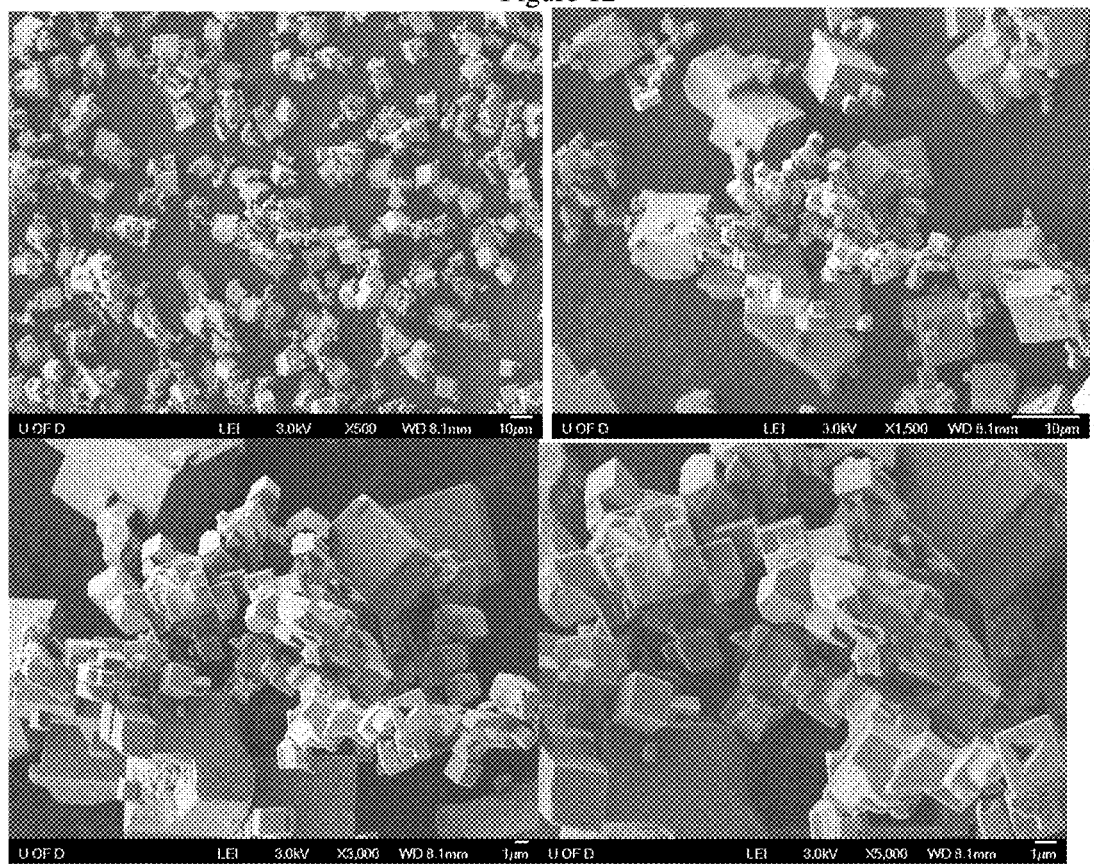
FIG. 12 is an SEM of calcined pure silica CHA seeds as described in Example 4.

The procedure in Example 3 was modified by the addition of pure silica CHA seeds in place of the calcined aluminosilicate CHA seeds. An SEM of the pure silica CHA seeds is shown in FIG. 12.

Figure 13:
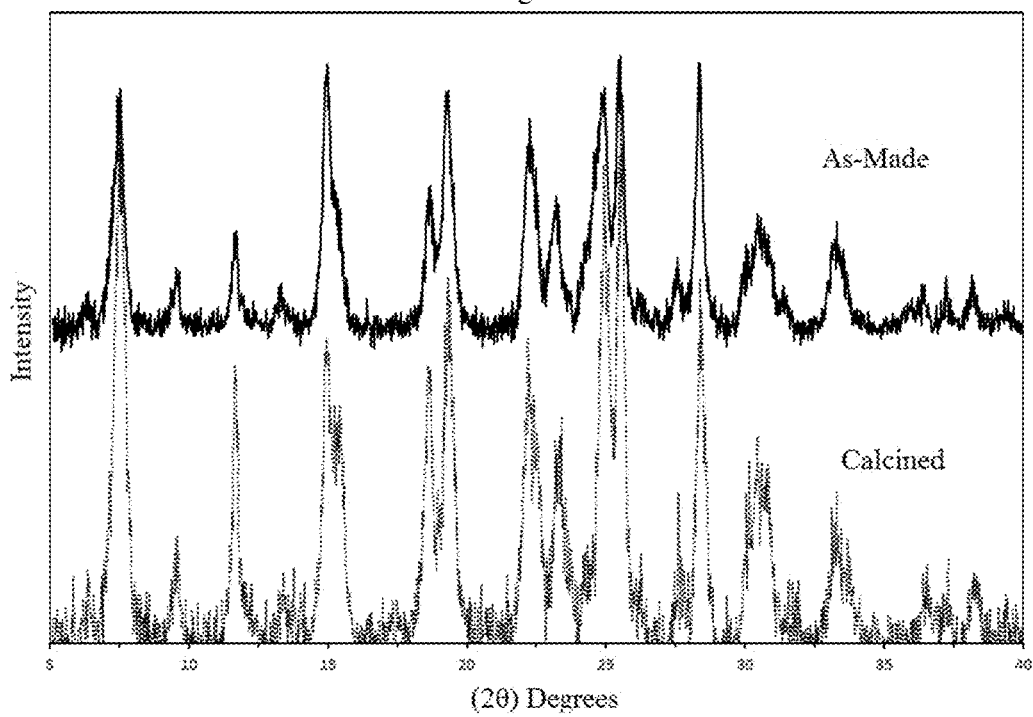
FIG. 13 is an XRD pattern of as-made and calcined JMZ-5 made using CHA seeds as described in Example 4.
Figure 14:
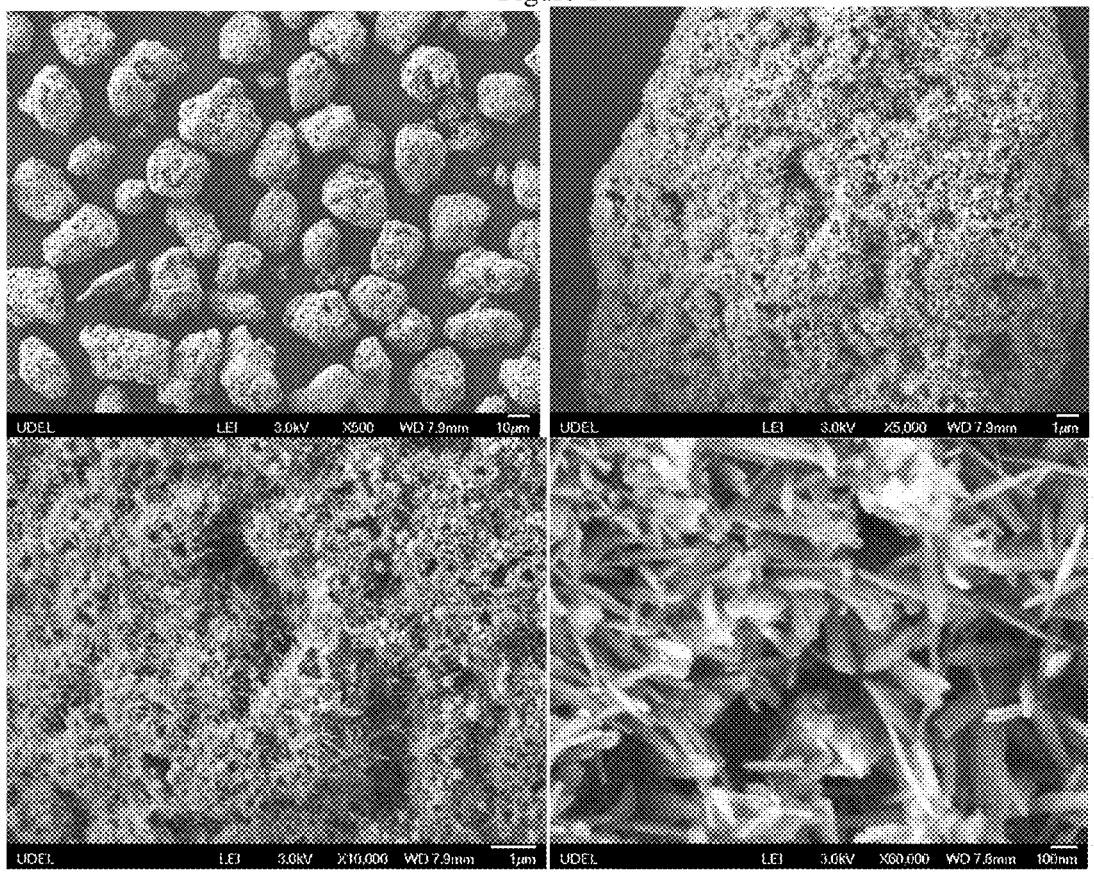
FIG. 14 is an SEM of calcined JMZ-5 prepared with calcined pure silica CHA seeds as described in Example 4.

Analysis of the dried powder by powder XRD (FIG. 13) indicated that the product was not in a pure SZR phase, but also contained peaks corresponding to a CHA crystal structure. SEM of the powder shows that the material produced using calcined pure silica CHA seeds had acicular (sea urchin like) morphology. (FIG. 14)

Example 5. Attempted Synthesis of JMZ-5 Using FAU Seeds

The procedure in Example 3 was modified by the addition of FAU seeds in place of the calcined aluminosilicate CHA seeds.

Figure 15:
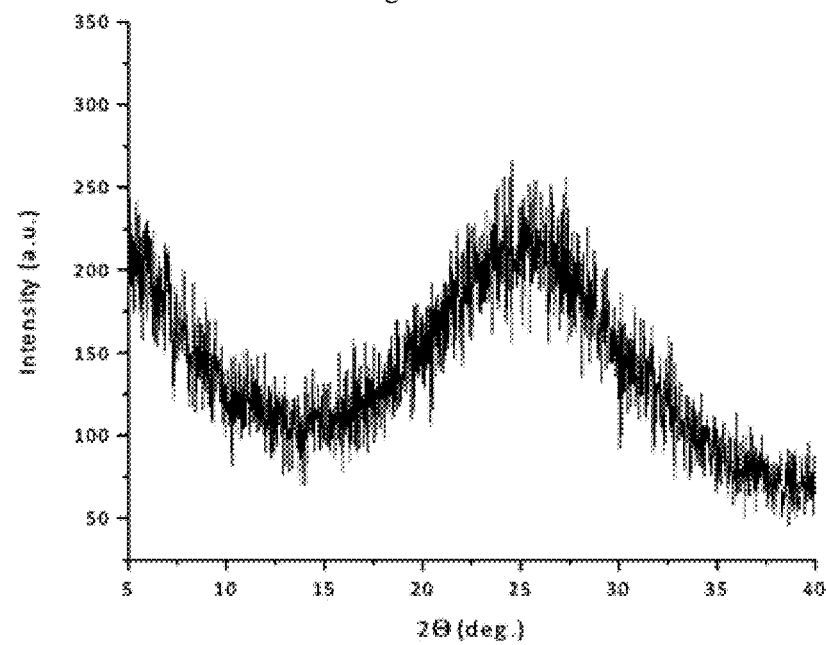
FIG. 15 is an XRD pattern of amorphous material made using FAU seeds as described in Example 5.

Analysis of the as-made dried powder by powder XRD (FIG. 15) indicated that the product was amorphous and did not have a crystal structure.

Example 6. Attempted Synthesis of JMZ-5 Using As-Made β-Zeolite (BEA) Seeds

The procedure in Example 3 was modified by the addition of as-made boron zeolite Beta seeds in place of the calcined aluminosilicate CHA seeds.

Figure 16:
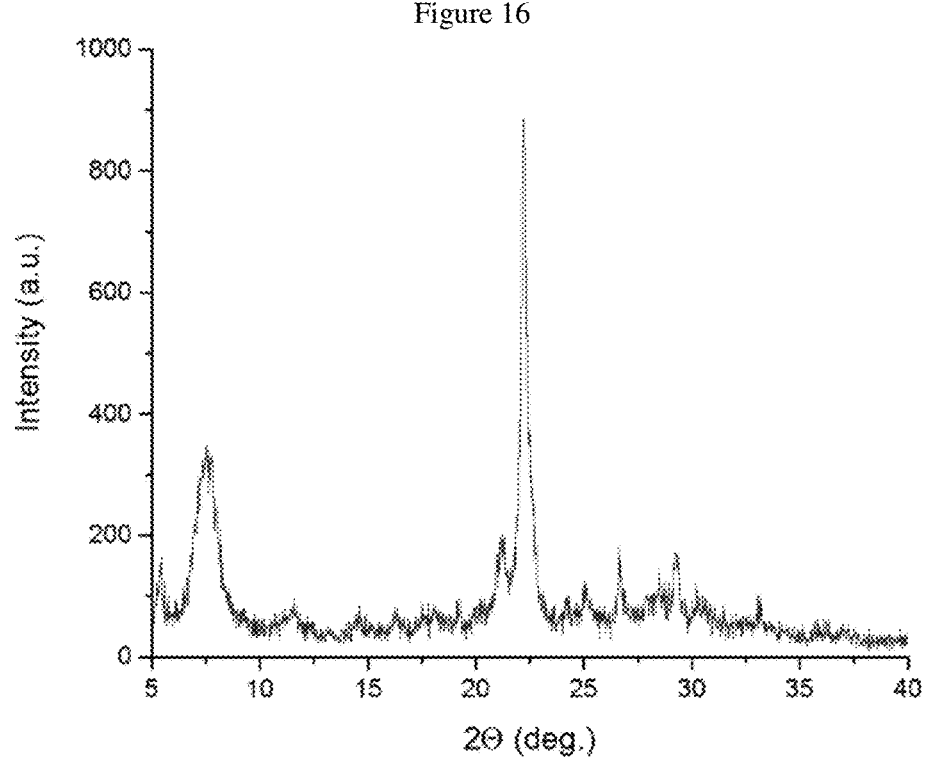
FIG. 16 is an XRD pattern of material having a BEA structure made from the reaction mixture using as-made boron BEA seeds as described in Example 6.

Analysis of the as-made and calcined dried powders by powder XRD (FIG. 16) indicated that the product had the BEA crystal structure, not the SZR crystal structure.

Example 7. Attempted Synthesis of JMZ-5 Using Calcined Aluminosilicate β-Zeolite (BEA) Seeds The procedure in Example 3 was modified by the addition of calcined aluminosilicate β-zeolite (BEA) seeds in place of the calcined aluminosilicate CHA seeds.

Figure 17:
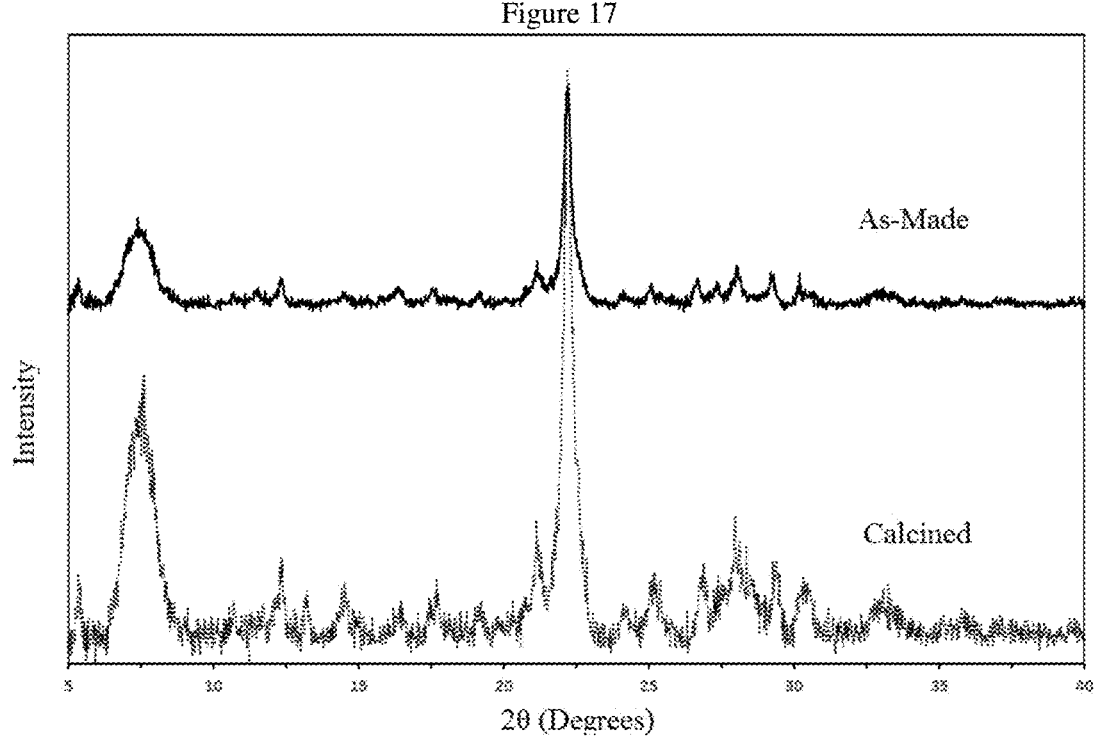
FIG. 17 is an XRD pattern of as-made and calcined material having a BEA structure made from the reaction mixture using calcined aluminosilicate beta-zeolite (BEA) seeds as described in Example 7.

Analysis of the as-made and calcined dried powders by powder XRD (FIG. 17) indicated that the product had the BEA crystal structure, not the SZR crystal structure.

Example 8. Attempted Synthesis of JMZ-5 Using As-Made Pure Silica LTA Seeds

The procedure in Example 3 was modified by the addition of as-made pure silica LTA seeds in place of the calcined aluminosilicate CHA seeds.

Figure 18:
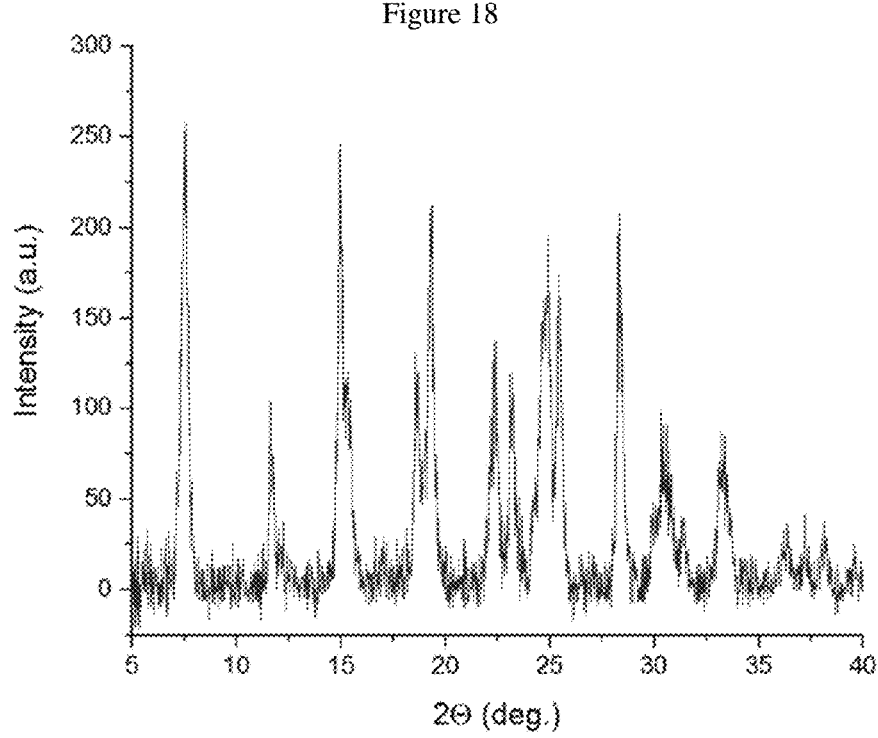
FIG. 18 is an XRD pattern of SZR made with as-made pure silica LTA seeds as described in Example 8.
Figure 19:
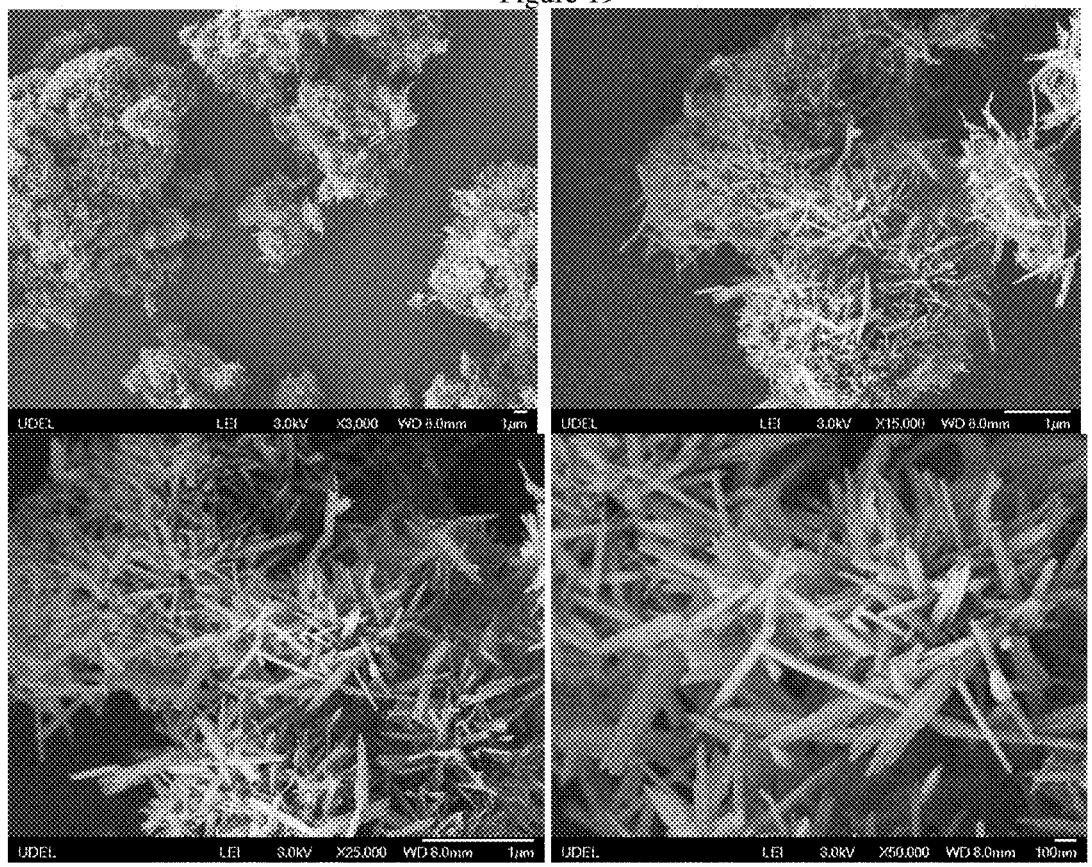
FIG. 19 is an SEM of calcined SZR made with as-made pure silica LTA seeds as described in Example 8.

Analysis of the as-made dried powder by powder XRD (FIG. 18) indicated that the product had SZR crystal structure. SEM of the powder shows that the as-made material produced using as-made silica LTA seeds had needle-like morphology and therefore did not produce JMZ-5 or JMZ-6. (FIG. 19)

Example 9. Synthesis of JMZ-5 Using Calcined Silica LTA Seeds

The procedure in Example 3 was modified by the addition of calcined silica LTA seeds in place of the calcined aluminosilicate CHA seeds.

Figure 20:
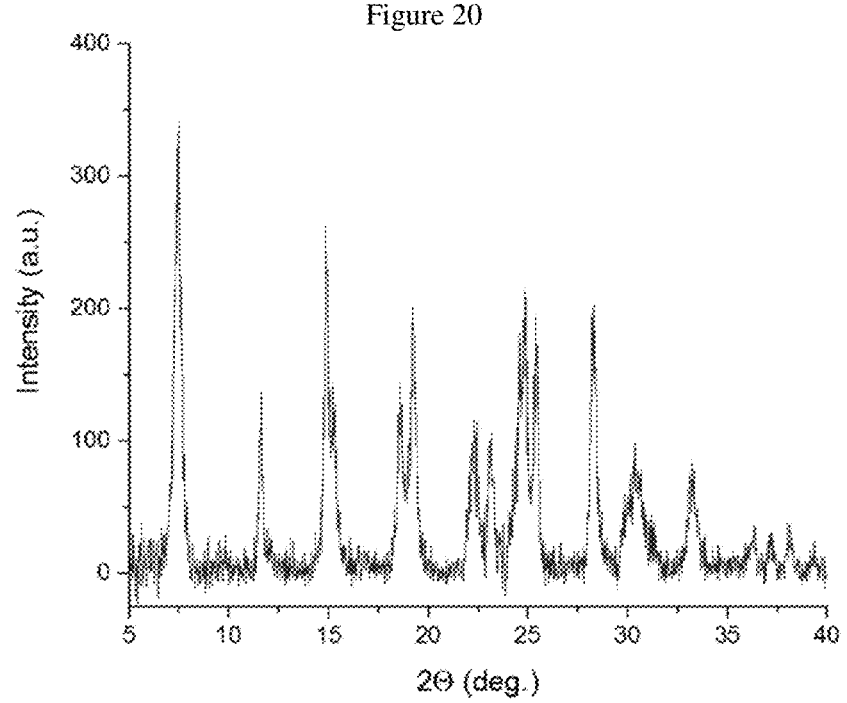
FIG. 20 is an XRD pattern of as-made JMZ-5 made with calcined pure silica LTA seeds as described in Example 9.
Figure 21:
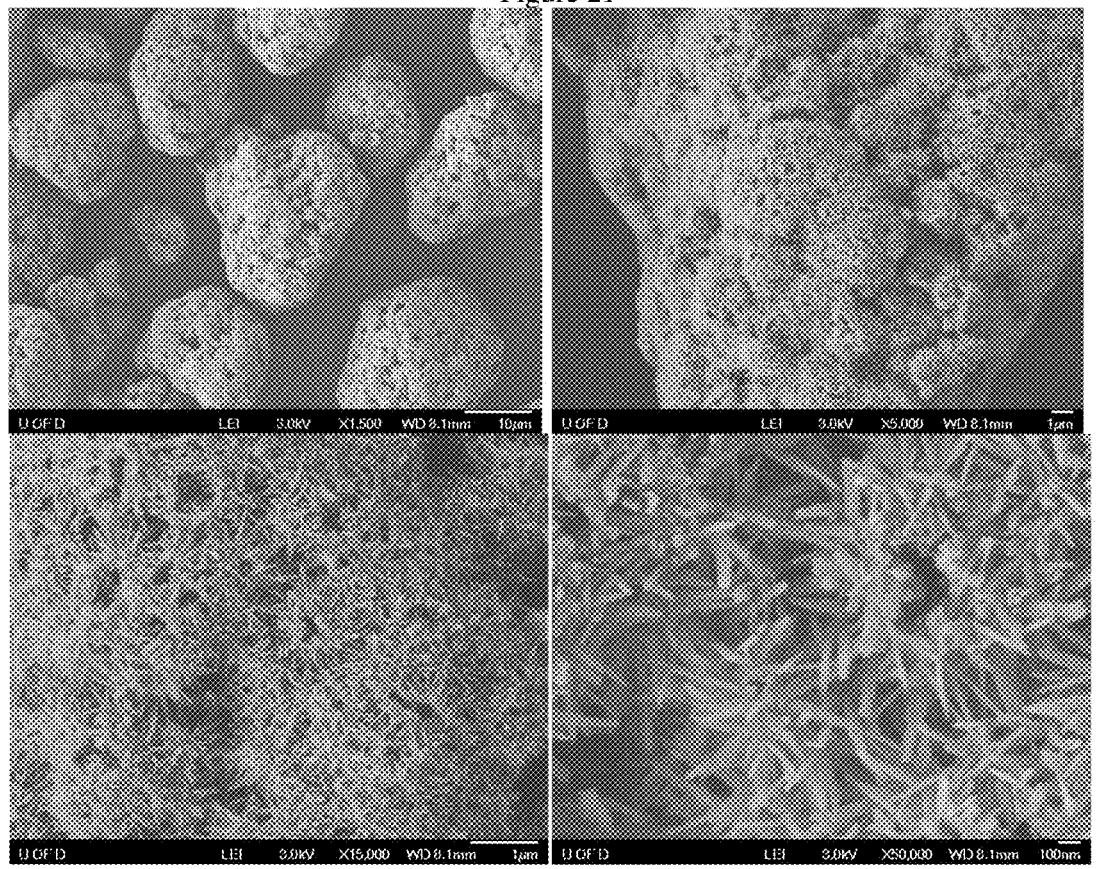
FIG. 21 is an SEM of calcined JMZ-5 made using calcined pure silica LTA seeds as described in Example 9.

Analysis of the as-made dried powder by powder XRD (FIG. 20) indicated that the product had SZR crystal structure. SEM of the calcined powder shows that the material produced using calcined silica LTA seeds had sea urchin morphology. (FIG. 21)

Example 10. Synthesis of JMZ-6 Using As-Made Aluminosilicate LTA Seeds

The procedure in Example 3 was modified by the addition of as-made aluminosilicate LTA seeds in place of the calcined aluminosilicate CHA seeds.

Figure 22:
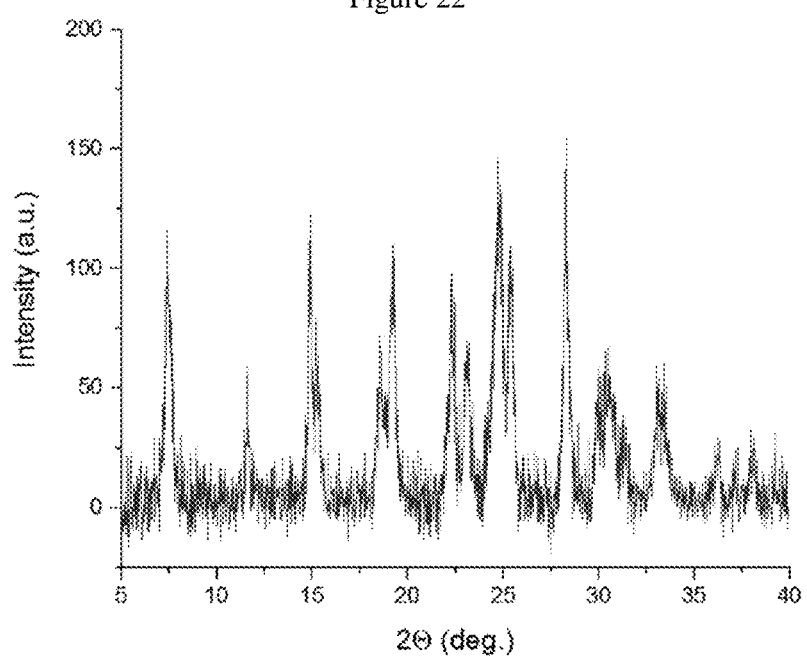
FIG. 22 is an XRD pattern of JMZ-6 made with as-made aluminosilicate LTA seeds as described in Example 10.
Figure 23:
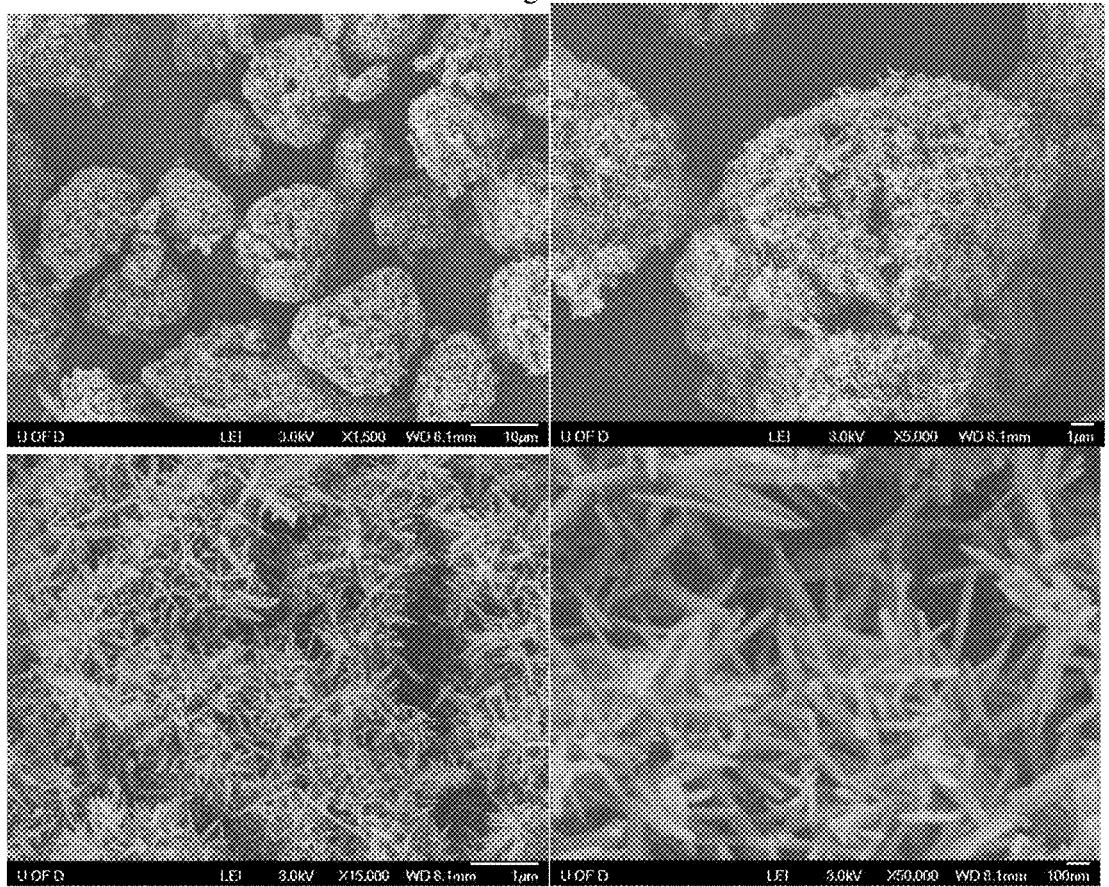
FIG. 23 is an SEM of calcined JMZ-6 made with as-made aluminosilicate LTA seeds as described in Example 10.

Analysis of the as-made dried powder by powder XRD (FIG. 22) indicated that the product had SZR crystal structure. SEM of the calcined powder shows that the material produced using as-made aluminosilicate LTA seeds had a needle-aggregates morphology. (FIG. 23)

Example 11. Synthesis of JMZ-5 Using Calcined Aluminosilicate LTA Seeds

The procedure in Example 3 was modified by the addition of calcined aluminosilicate LTA seeds in place of the calcined aluminosilicate CHA seeds.

Figure 24:
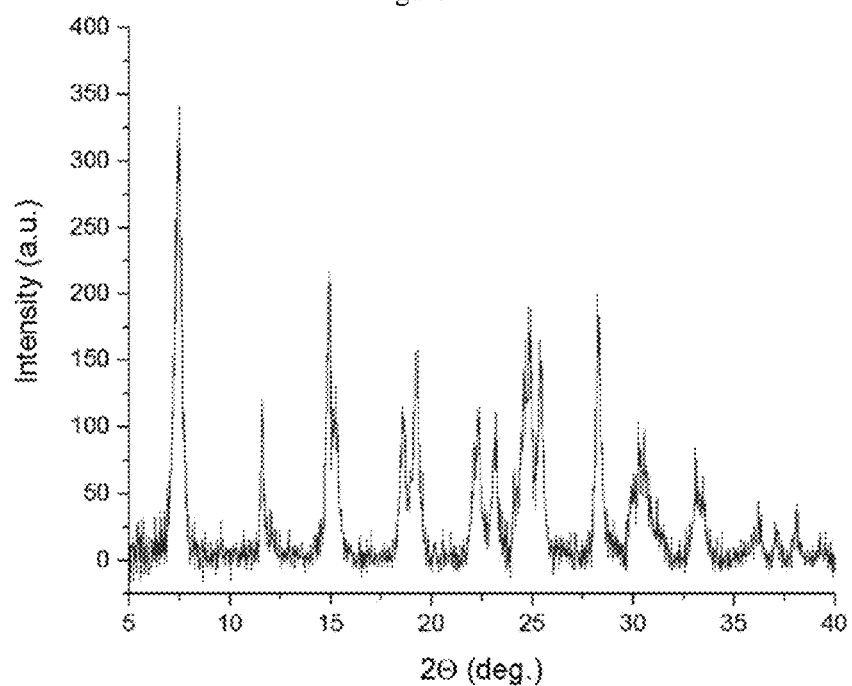
FIG. 24 is an XRD pattern of JMZ-5 made with calcined aluminosilicate LTA seeds as described in Example 11.
Figure 25:
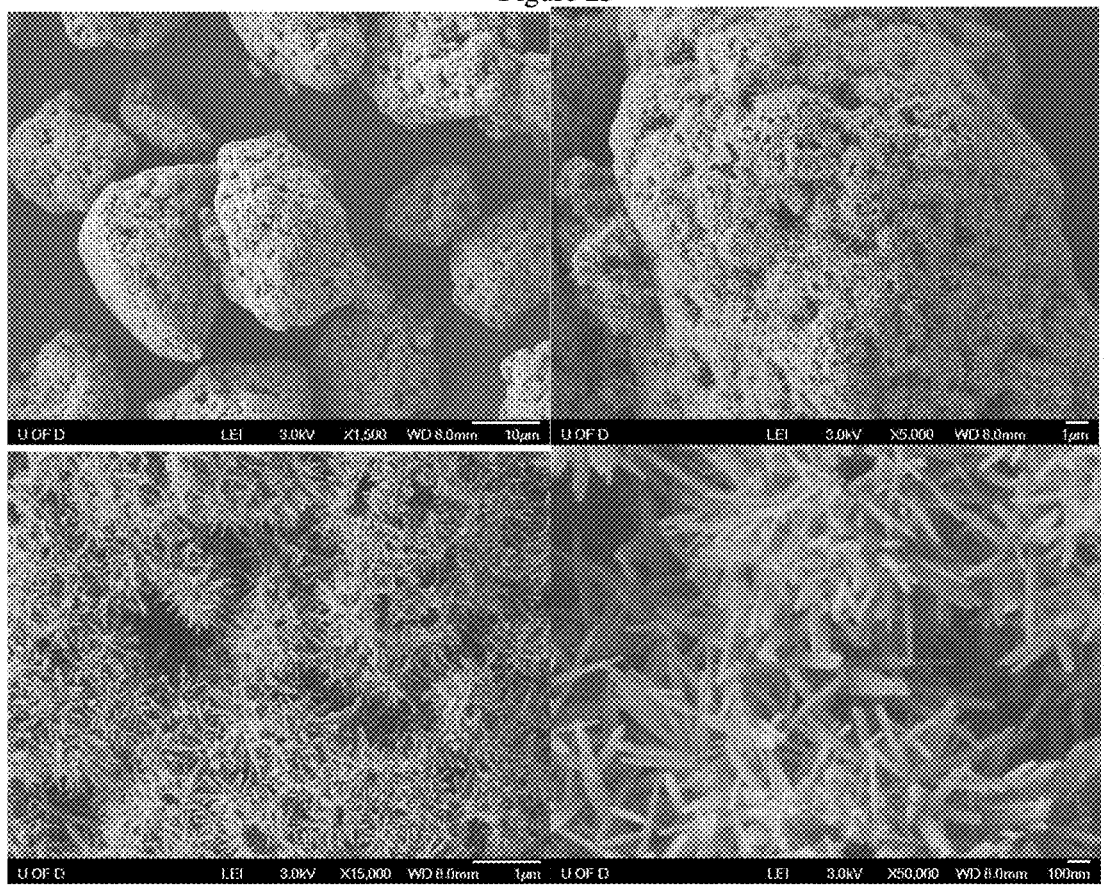
FIG. 25 is an SEM of calcined JMZ-5 made with calcined aluminosilicate LTA seeds as described in Example 11.

Analysis of the as-made dried powder by powder XRD (FIG. 24) indicated that the product had SZR crystal structure. SEM of the calcined powder shows that the material produced using calcined aluminosilicate LTA seeds had sea urchin morphology. (FIG. 25)

Example 12. Catalyst Testing for $NH_3$ SCR

Calcined JMZ-5 product, JMZ-5C, was impregnated with copper at a loading of 3 wt % using the required amount of copper (II) acetate monohydrate (Alfa Aesar) dissolved in de-mineralised water. The impregnated sample was dried overnight at 105° C. and then calcined in air at 500° C. for 2 hours.

Similar samples were prepared using AEI and BEA.

Samples of the powdered catalyst were pelletized and then aged in a flow of 4.5% $H_2O$ in air. The samples were heated at a rate of 10° C./min to 900° C. After being held at a temperature of 900° C. for either 1 or 3 hours, the samples were cooled in the steam/air mixture until then temperature was <200° C., then air only flowed over the samples until they cooled to about room temperature.

Pelletized samples of the powder catalyst were tested in an apparatus in which a gas comprising 500 ppm NOx (NO-only), 550 ppm $NH_3$, 10% $O_2$, 10% $H_2O$, with the remainder being $N_2$ flowed over the catalyst at a space velocity of 60K (390 L/gcat/h). The temperature was increased (ramped) from 150 to 500° C. at 5° C./minute.

Figure 26:
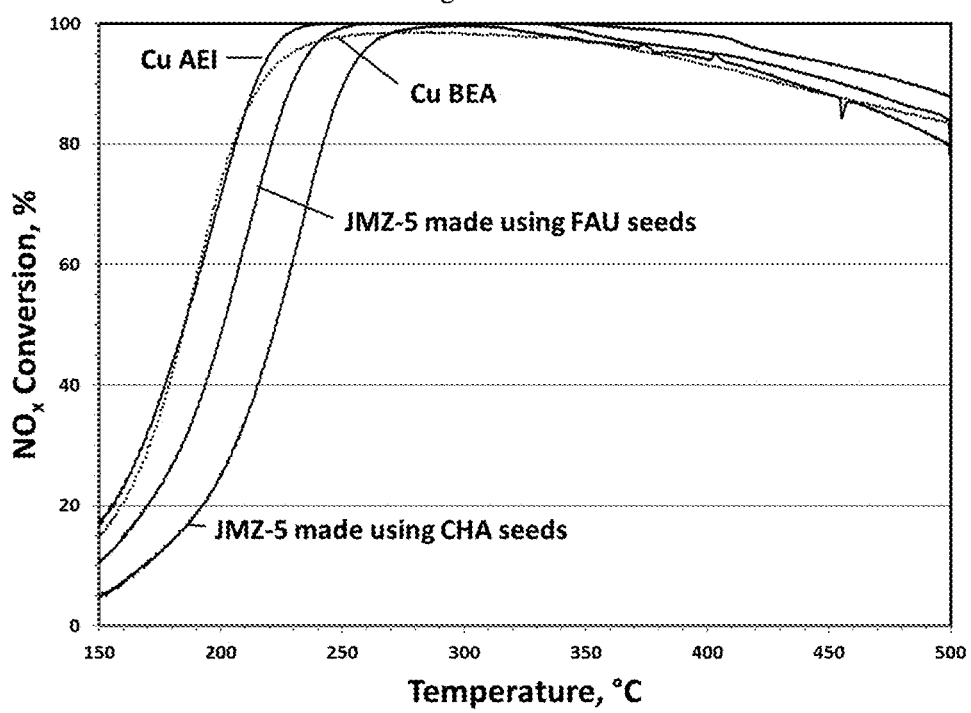
FIG. 26 is a graph showing the % NOx conversion of fresh JMZ-5 made using FAU seeds and CHA seeds, with Cu-CHA and BEA as described in Example 12.
Figure 27:
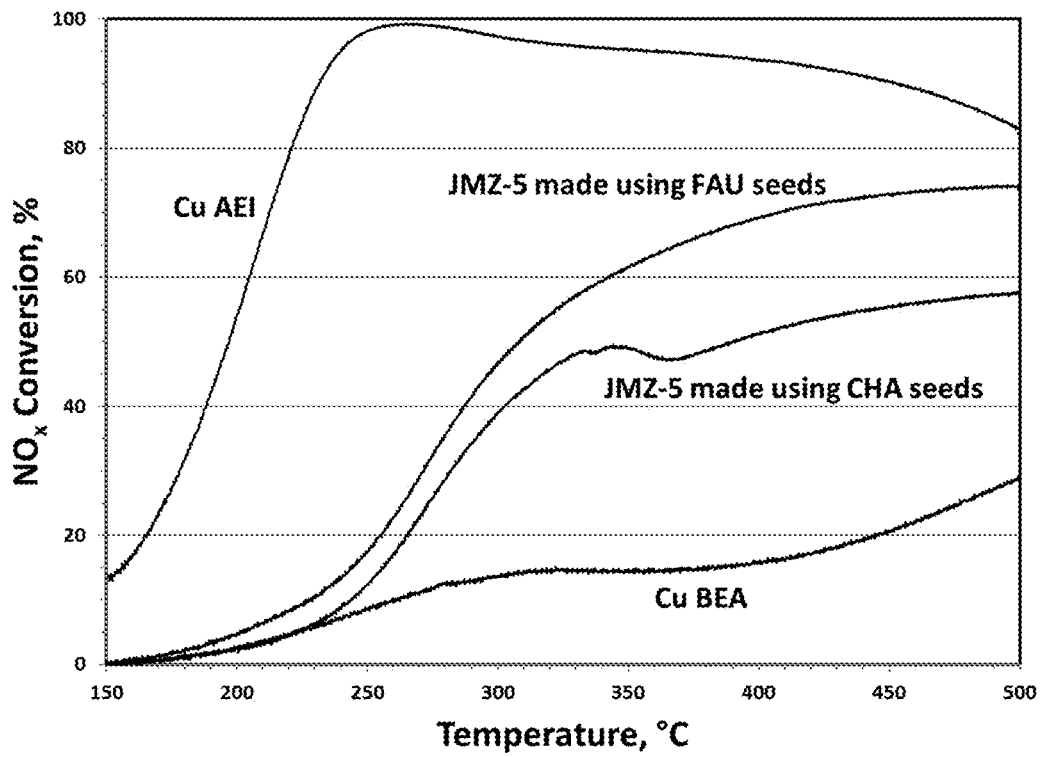
FIG. 27 is a graph showing the % NOx conversion of aged JMZ-5 made using FAU seeds and CHA seeds, with Cu-CHA and BEA as described in Example 12.
Figure 28:
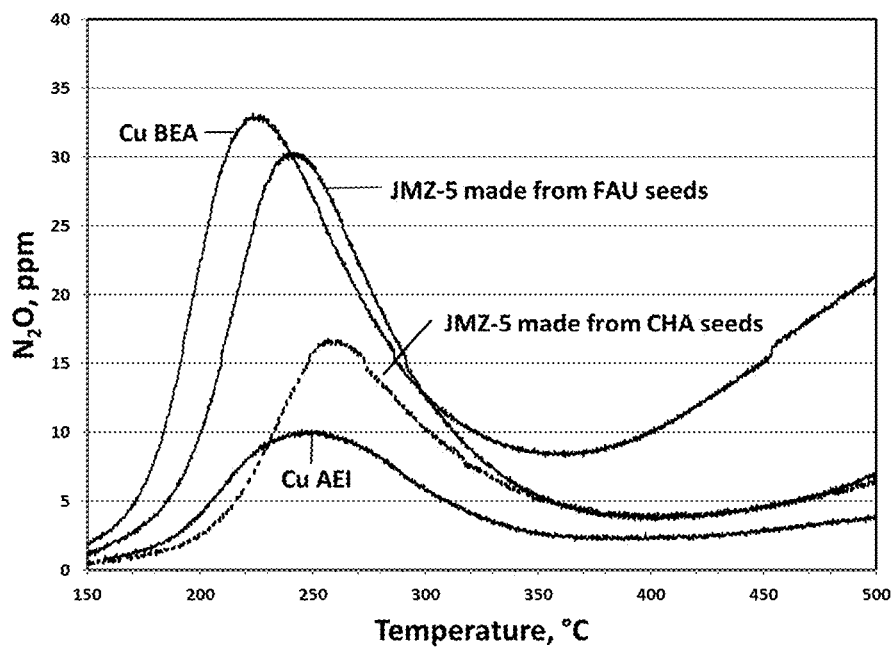
FIG. 28 is a graph showing the % $N_2O$ conversion of fresh JMZ-5 made using FAU seeds and CHA seeds, with Cu-CHA and BEA as described in Example 12.

Fresh and aged NOx conversion activity profiles over temperatures from about 150° C. to about 500° C. are given in FIGS. 26 and 28 (fresh, aged 1 hour and aged 3 hours, respectively). The activity of fresh samples of JMZ-5 had a higher T50 (the temperature for 50% conversion) than the AEI and BEA samples. The aged samples of JMZ-5 and BEA showed a decrease in NOx conversion, with BEA being most affected by aging. Both of the JMZ-5 samples had levels of NOx conversion greater than that of BEA at starting at temperatures of about 200-250° C. At temperatures above about 250° C., the amount of NOx conversion was about 15-25% higher than that from the BEA samples.

Figure 29:
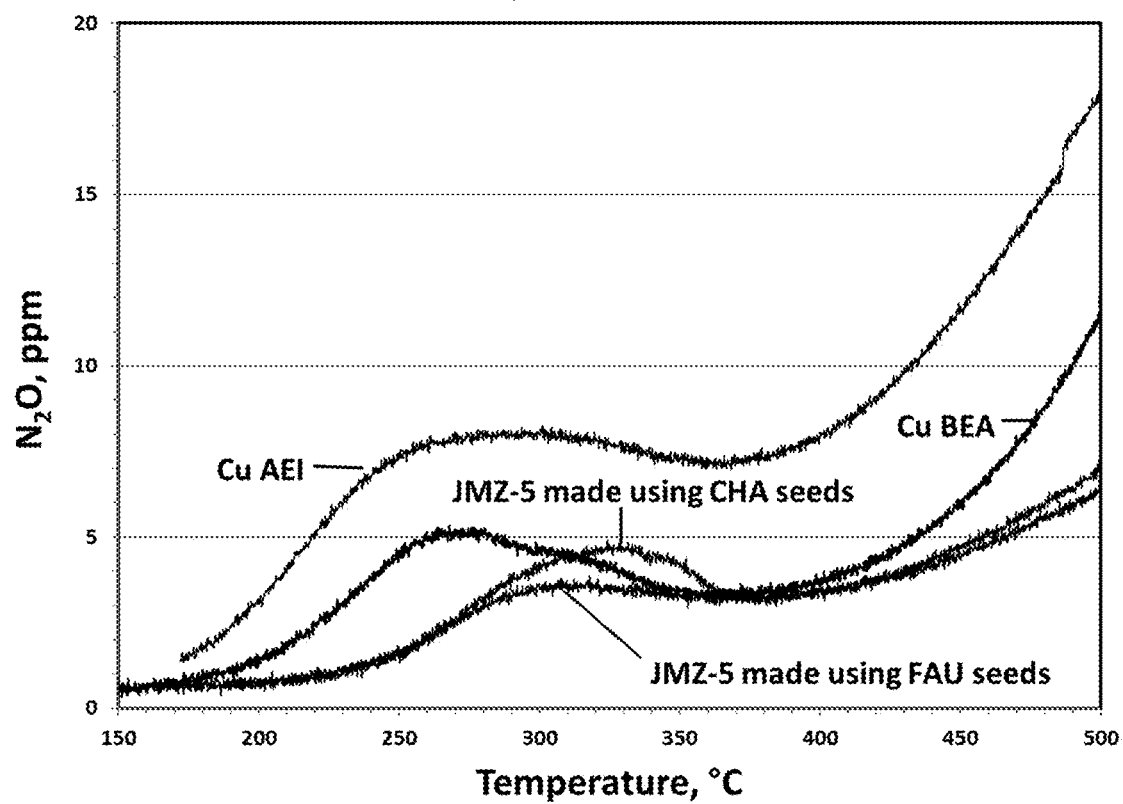
FIG. 29 is a graph showing the % $N_2O$ conversion of aged JMZ-5 made using FAU seeds and CHA seeds, with Cu-CHA and BEA as described in Example 12.

The concentration of $N_2O$ in gas passing through fresh and aged catalysts over temperatures from about 150° C. to about 500° C. are given in FIGS. 28 and 29 (fresh, aged 1 hour and aged 3 hours, respectively). Gas flowing into the apparatus contained 500 ppm NOx as NO-only. In the fresh samples, the levels of $N_2O$ in gas after passing through the AEI catalyst were the lowest, with JMZ-5 samples made with CHA seeds provide the next lowest $N_2O$ levels. $N_2O$ levels from the JMZ-5 samples made with FAU source provide $N_2O$ levels that were similar to those from BEA, except the peaks level in this JMZ-5 sample occurred at about 20° C. higher. In the aged samples, AEI produced the highest levels. This appears to be related to the much higher NOx conversion from this sample. The two JMZ-5 samples produced less $N_2O$ than BEA at temperatures from about 200-300 C and above 400 C, and comparable amount of $N_2O$ as from BEA from about 300-400° C.

This shows that both JMZ-5 samples had delayed fresh lightoff, selectivity similar to BEA, and improved durability relative to BEA.

What is claimed is:

1. An aluminosilicate molecular sieve comprising an SZR type framework and having acicular type morphology (JMZ-5).

2. The aluminosilicate molecular sieve of claim 1, having an X-ray powder diffraction pattern substantially similar to that of an SZR type framework.

3. The aluminosilicate molecular sieve of claim 1, where the molecular sieve has a silica to alumina ratio (SAR) of 15 to 40.

4. The aluminosilicate molecular sieve of claim 1, where the aluminosilicate molecular sieve further comprises a structure-directing agent comprising tetraethylammonium cations, N', N', N', N', N', N'-hexaethylpentanediammonium cations or quinuclidine.

5. A calcined aluminosilicate molecular sieve comprising a SZR type framework and having a sea-urchin type crystal.

6. The calcined aluminosilicate molecular sieve of claim 5, wherein the calcined aluminosilicate molecular sieve further comprises an extra-framework metal, wherein the extra-framework metal is an alkali metal, an alkaline earth metal, a transition metal or a mixture thereof.

7. The calcined aluminosilicate molecular sieve of claim 6, where the extra-framework metal comprises calcium, cerium, cobalt, copper, chromium, iron, lithium, manganese, nickel, potassium, sodium, strontium or a combination of two or more of these metals.

8. A catalyst composition comprising a calcined aluminosilicate molecular sieve of claim 5.

9. The catalyst composition of claim 8, wherein the catalyst further comprises an extra-framework metal, wherein the extra-framework metal comprises an alkali metal, an alkaline earth metal, a transition metal or a mixture thereof.

10. The catalyst composition of claim 9, wherein the extra-framework metal comprises about 0.1 to about 10 weight percent of total weight of the molecular sieves, extra-framework metal and catalytically active metal in the catalyst a transition metal or noble metal.

11. The catalyst composition of claim 9, wherein the extra-framework metal is calcium, cerium, cobalt, copper, chromium, iron, lithium, manganese, molybdenum, nickel, niobium, potassium, sodium, strontium, tantalum, tungsten, or vanadium or a combination of two or more of these metals.

12. The catalyst composition of claim 11, wherein the molecular sieve comprises about 0.1 to about 10 weight percent of copper, iron, manganese or a combination of two or more of these metals.

13. A catalyst article for treating exhaust gas, the catalyst article comprising a calcined aluminosilicate molecular sieve of claim 5, where the calcined aluminosilicate molecular sieve is disposed on and/or within a substrate.

* * * * *